(12) United States Patent
Upadhyay

(10) Patent No.: US 11,815,993 B2
(45) Date of Patent: *Nov. 14, 2023

(54) REMEDIAL ACTION BASED ON MAINTAINING PROCESS AWARENESS IN DATA STORAGE MANAGEMENT

(71) Applicant: Commvault Systems, Inc., Tinton Falls, NJ (US)

(72) Inventor: Mrityunjay Upadhyay, UttarPradesh (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,264

(22) Filed: Nov. 9, 2021

(65) Prior Publication Data
US 2022/0066863 A1 Mar. 3, 2022

Related U.S. Application Data

(63) Continuation of application No. 16/906,424, filed on Jun. 19, 2020, now Pat. No. 11,200,110, which is a
(Continued)

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0721* (2013.01); *G06F 11/30* (2013.01); *G06F 11/3024* (2013.01); *G06F 11/3419* (2013.01)

(58) Field of Classification Search
CPC .... G06F 11/0793; G06F 11/30; G06F 11/302; G06F 11/3034; G06F 11/3409; G06F 11/3452
See application file for complete search history.

(56) References Cited

U.S. PATENT DOCUMENTS

| 4,686,620 A | 8/1987 | Ng |
| 4,995,035 A | 2/1991 | Cole et al. |

(Continued)

FOREIGN PATENT DOCUMENTS

| EP | 0259912 | 3/1988 |
| EP | 0405926 | 1/1991 |

(Continued)

OTHER PUBLICATIONS

U.S. Appl. No. 13/606,371, filed Sep. 7, 2012, Kavuri.
(Continued)

*Primary Examiner* — Charles Ehne
(74) *Attorney, Agent, or Firm* — Commvault Systems, Inc.

(57) ABSTRACT

An illustrative data storage management system comprises "awareness logic" that executes on computing devices hosting storage management components such as storage manager, data agent, media agent, and/or other storage management applications. The illustrative awareness logic operates within each of these illustrative components, e.g., as a thread within processes of the storage management component, such as storage management core process, file identifier process, log monitoring process, etc. The awareness logic monitors the targeted process over time and triggers remedial action when criteria are met. Certain vital statistics of each process are collected periodically and analyzed by the illustrative awareness logic, such as CPU usage, memory usage, and handle counts. Criteria for corrective action include rising trends based on local minima data points for one or more vital statistics of the process. Other criteria include exceeding a threshold based on a logarithm function of the collected data points.

20 Claims, 18 Drawing Sheets

Related U.S. Application Data continuation of application No. 15/868,948, filed on Jan. 11, 2018, now Pat. No. 10,831,591.

(51) Int. Cl.
*G06F 11/30* (2006.01)
*G06F 11/34* (2006.01)

(56) References Cited

U.S. PATENT DOCUMENTS

| | | | |
|---|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,313,631 A | 5/1994 | Kao |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,561,825 A | 10/1996 | Yamagami et al. |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,956,716 A | 9/1999 | Kenner et al. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,058,066 A | 5/2000 | Norris et al. |
| 6,076,148 A | 6/2000 | Kedem et al. |
| 6,088,697 A | 7/2000 | Crockett et al. |
| 6,094,416 A | 7/2000 | Ying |
| 6,131,095 A | 10/2000 | Low et al. |
| 6,131,147 A | 10/2000 | Takagi |
| 6,131,190 A | 10/2000 | Sidwell |
| 6,148,412 A | 11/2000 | Cannon et al. |
| 6,154,787 A | 11/2000 | Urevig et al. |
| 6,157,963 A | 12/2000 | Courtright, III et al. |
| 6,161,111 A | 12/2000 | Mutalik et al. |
| 6,167,402 A | 12/2000 | Yeager |
| 6,209,059 B1 | 3/2001 | Ofer et al. |
| 6,212,512 B1 | 4/2001 | Barney et al. |
| 6,260,068 B1 | 7/2001 | Zalewski et al. |
| 6,260,069 B1 | 7/2001 | Anglin |
| 6,260,129 B1 | 7/2001 | Crockett et al. |
| 6,269,431 B1 | 7/2001 | Dunham |
| 6,272,386 B1 | 8/2001 | McLaughlin et al. |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,385,706 B1 | 5/2002 | Ofek et al. |
| 6,389,432 B1 | 5/2002 | Pothapragada et al. |
| 6,389,559 B1 | 5/2002 | Sawdy et al. |
| 6,397,166 B1 | 5/2002 | Leung et al. |
| 6,414,985 B1 | 7/2002 | Furukawa et al. |
| 6,418,478 B1 | 7/2002 | Ignatius et al. |
| 6,421,711 B1 | 7/2002 | Blumenau et al. |
| 6,438,595 B1 | 8/2002 | Blumenau et al. |
| 6,466,950 B1 | 10/2002 | Ono |
| 6,487,561 B1 | 11/2002 | Ofek et al. |
| 6,516,314 B1 | 2/2003 | Birkler et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,542,468 B1 | 4/2003 | Hatakeyama |
| 6,542,972 B2 | 4/2003 | Ignatius et al. |
| 6,564,228 B1 | 5/2003 | O'Connor |
| 6,587,970 B1 | 7/2003 | Wang et al. |
| 6,594,698 B1 | 7/2003 | Chow et al. |
| 6,604,118 B2 | 8/2003 | Kleinman et al. |
| 6,611,849 B1 | 8/2003 | Raff et al. |
| 6,629,189 B1 | 9/2003 | Sandstrom |
| 6,643,801 B1 | 11/2003 | Jammu et al. |
| 6,658,436 B2 | 12/2003 | Oshinsky et al. |
| 6,658,526 B2 | 12/2003 | Nguyen et al. |
| 6,658,652 B1 | 12/2003 | Alexander, III et al. |
| 6,671,818 B1 | 12/2003 | Mikurak |
| 6,691,209 B1 | 2/2004 | O'Connell |
| 6,732,124 B1 | 5/2004 | Koseki et al. |
| 6,771,595 B1 | 8/2004 | Gilbert et al. |
| 6,792,472 B1 | 9/2004 | Otterness et al. |
| 6,820,035 B1 | 11/2004 | Zahavi |
| 6,823,507 B1 | 11/2004 | Srinivasan et al. |
| 6,839,724 B2 | 1/2005 | Manchanda et al. |
| 6,925,476 B1 | 8/2005 | Multer et al. |
| 6,952,737 B1 | 10/2005 | Coates et al. |
| 7,035,880 B1 | 4/2006 | Crescenti et al. |
| 7,065,615 B2 | 6/2006 | Sugino et al. |
| 7,068,597 B1 | 6/2006 | Fijolek et al. |
| 7,082,441 B1 | 7/2006 | Zahavi et al. |
| 7,085,904 B2 | 8/2006 | Mizuno et al. |
| 7,089,281 B1 | 8/2006 | Kazemi et al. |
| 7,093,012 B2 | 8/2006 | Olstad et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,120,757 B2 | 10/2006 | Tsuge |
| 7,130,970 B2 | 10/2006 | Devassy et al. |
| 7,146,377 B2 | 12/2006 | Nowicki et al. |
| 7,158,985 B1 | 1/2007 | Liskov |
| 7,197,490 B1 | 3/2007 | English |
| 7,203,944 B1 | 4/2007 | van Rietschote et al. |
| 7,216,244 B2 | 5/2007 | Amano |
| 7,231,391 B2 | 6/2007 | Aronoff |
| 7,246,207 B2 | 7/2007 | Kottomtharayil et al. |
| 7,292,969 B1 | 11/2007 | Aharoni et al. |
| 7,315,923 B2 | 1/2008 | Retnamma et al. |
| 7,340,652 B2 | 3/2008 | Jarvis et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,373,364 B1 | 5/2008 | Chapman |
| 7,380,039 B2 | 5/2008 | Miloushev et al. |

(56) References Cited

U.S. PATENT DOCUMENTS

| | | |
|---|---|---|
| 7,395,282 B1 | 7/2008 | Crescenti et al. |
| 7,401,064 B1 | 7/2008 | Arone et al. |
| 7,454,569 B2 | 11/2008 | Kavuri et al. |
| 7,461,101 B2 | 12/2008 | Hsu et al. |
| 7,461,230 B1 | 12/2008 | Gupta et al. |
| 7,469,262 B2 | 12/2008 | Baskaran et al. |
| 7,472,312 B2 | 12/2008 | Jarvis et al. |
| 7,490,207 B2 | 2/2009 | Amarendran et al. |
| 7,502,902 B2 | 3/2009 | Sato et al. |
| 7,529,745 B2 | 5/2009 | Ahluwalia et al. |
| 7,529,782 B2 | 5/2009 | Prahlad et al. |
| 7,529,827 B2 | 5/2009 | Devraj et al. |
| 7,533,181 B2 | 5/2009 | Dawson et al. |
| 7,536,291 B1 | 5/2009 | Vijayan Retnamma et al. |
| 7,536,693 B1 | 5/2009 | Manczak et al. |
| 7,546,354 B1 | 6/2009 | Fan et al. |
| 7,546,364 B2 | 6/2009 | Raman et al. |
| 7,617,262 B2 | 11/2009 | Prahlad et al. |
| 7,617,321 B2 | 11/2009 | Clark |
| 7,644,245 B2 | 1/2010 | Prahlad et al. |
| 7,721,202 B2 | 5/2010 | Fuchs et al. |
| 7,734,669 B2 | 6/2010 | Kottomtharayil et al. |
| 7,747,579 B2 | 6/2010 | Prahlad et al. |
| 7,765,167 B2 | 7/2010 | Prahlad et al. |
| 7,769,734 B2 | 8/2010 | Lyons |
| 7,788,127 B1 | 8/2010 | Gilgur et al. |
| 7,831,566 B2 | 11/2010 | Kavuri et al. |
| 7,904,681 B1 | 3/2011 | Bappe |
| 8,112,605 B2 | 2/2012 | Kavuri |
| 8,156,086 B2 | 4/2012 | Lu et al. |
| 8,170,995 B2 | 5/2012 | Prahlad et al. |
| 8,185,502 B2 | 5/2012 | Irisawa et al. |
| 8,230,195 B2 | 7/2012 | Amarendran et al. |
| 8,266,406 B2 | 9/2012 | Kavuri |
| 8,285,681 B2 | 10/2012 | Prahlad et al. |
| 8,306,926 B2 | 11/2012 | Prahlad et al. |
| 8,307,177 B2 | 11/2012 | Prahlad et al. |
| 8,335,776 B2 | 12/2012 | Gokhale |
| 8,364,652 B2 | 1/2013 | Vijayan et al. |
| 8,578,120 B2 | 11/2013 | Attarde et al. |
| 8,661,216 B2 | 2/2014 | Kavuri et al. |
| 8,700,875 B1 | 4/2014 | Barron et al. |
| 8,706,993 B2 | 4/2014 | Prahlad et al. |
| 8,725,980 B2 | 5/2014 | Kavuri |
| 8,751,463 B1 | 6/2014 | Chamness et al. |
| 8,935,493 B1 | 1/2015 | Dolan et al. |
| 8,954,446 B2 | 2/2015 | Retnamma et al. |
| 9,020,900 B2 | 4/2015 | Retnamma et al. |
| 9,021,200 B1 | 4/2015 | Kushmerick |
| 9,026,718 B2 | 5/2015 | Rabeler et al. |
| 9,098,495 B2 | 8/2015 | Gokhale |
| 9,111,220 B2 | 8/2015 | Prahlad et al. |
| 9,152,685 B2 | 10/2015 | Kavuri et al. |
| 9,158,653 B2 | 10/2015 | Gold |
| 9,164,692 B2 | 10/2015 | Kavurl |
| 9,235,535 B1 | 1/2016 | Shim et al. |
| 9,239,687 B2 | 1/2016 | Vijayan et al. |
| 9,405,471 B2 | 8/2016 | Prahlad et al. |
| 9,448,892 B2 | 9/2016 | Kavuri et al. |
| 9,519,432 B1 | 12/2016 | Haustein et al. |
| 9,589,029 B2 | 3/2017 | Choudhary et al. |
| 9,830,223 B1 | 11/2017 | Holenstein et al. |
| 9,916,111 B2 | 3/2018 | Kavuri et al. |
| 9,990,196 B2 | 6/2018 | Ben-Dayan Rubin et al. |
| 10,013,170 B1 | 7/2018 | Sahin et al. |
| 10,133,507 B2 | 11/2018 | Kavuri et al. |
| 10,176,036 B2 | 1/2019 | Haridas et al. |
| 10,248,494 B2 | 4/2019 | Haridas et al. |
| 10,275,320 B2 | 4/2019 | Thanasekaran |
| 10,282,113 B2 | 5/2019 | Prahlad et al. |
| 10,379,988 B2 | 8/2019 | Kochunni et al. |
| 10,452,444 B1 | 10/2019 | Jibaja et al. |
| 10,564,870 B1 | 2/2020 | Greenwood et al. |
| 10,684,924 B2 | 6/2020 | Kilaru et al. |
| 10,754,756 B2 * | 8/2020 | Ocariza, Jr. ......... G06F 11/3466 |
| 10,831,591 B2 | 11/2020 | Upadhyay |
| 10,901,615 B2 | 1/2021 | Prahlad et al. |
| 11,132,139 B2 | 9/2021 | Kavuri et al. |
| 11,200,110 B2 | 12/2021 | Upadhyay |
| 2001/0034795 A1 | 10/2001 | Moulton et al. |
| 2001/0044879 A1 | 11/2001 | Moulton et al. |
| 2001/0047400 A1 | 11/2001 | Coates et al. |
| 2002/0019909 A1 | 2/2002 | D'Errico |
| 2002/0065919 A1 | 5/2002 | Taylor et al. |
| 2002/0120741 A1 | 8/2002 | Webb et al. |
| 2002/0124137 A1 | 9/2002 | Ulrich et al. |
| 2002/0129216 A1 | 9/2002 | Collins |
| 2002/0143999 A1 | 10/2002 | Yamagami |
| 2002/0181395 A1 | 12/2002 | Foster et al. |
| 2002/0194526 A1 | 12/2002 | Ulrich et al. |
| 2003/0005119 A1 | 1/2003 | Mercier et al. |
| 2003/0023743 A1 | 1/2003 | Raphel et al. |
| 2003/0023893 A1 | 1/2003 | Lee et al. |
| 2003/0035419 A1 | 2/2003 | Chin et al. |
| 2003/0037061 A1 | 2/2003 | Sastri et al. |
| 2003/0061456 A1 | 3/2003 | Ofek et al. |
| 2003/0065759 A1 | 4/2003 | Britt et al. |
| 2003/0079018 A1 | 4/2003 | Lolayekar et al. |
| 2003/0126200 A1 | 7/2003 | Wolff |
| 2003/0145086 A1 | 7/2003 | O'Reilly |
| 2003/0161338 A1 | 8/2003 | Ng et al. |
| 2003/0167380 A1 | 9/2003 | Green et al. |
| 2003/0188119 A1 | 10/2003 | Lubbers et al. |
| 2003/0212859 A1 | 11/2003 | Ellis et al. |
| 2003/0225800 A1 | 12/2003 | Kavuri |
| 2004/0006572 A1 | 1/2004 | Hoshino et al. |
| 2004/0006578 A1 | 1/2004 | Yu |
| 2004/0010487 A1 | 1/2004 | Prahlad et al. |
| 2004/0078632 A1 | 4/2004 | Infante et al. |
| 2004/0117438 A1 | 6/2004 | Considine et al. |
| 2004/0122917 A1 | 6/2004 | Menon et al. |
| 2004/0128363 A1 | 7/2004 | Yamagami |
| 2004/0133634 A1 | 7/2004 | Luke |
| 2004/0153481 A1 | 8/2004 | Talluri |
| 2004/0181632 A1 | 9/2004 | Factor et al. |
| 2004/0193625 A1 | 9/2004 | Sutoh |
| 2004/0199734 A1 | 10/2004 | Rajamani et al. |
| 2004/0225437 A1 | 11/2004 | Endo et al. |
| 2004/0230862 A1 | 11/2004 | Merchant et al. |
| 2004/0249972 A1 | 12/2004 | White et al. |
| 2004/0250033 A1 | 12/2004 | Prahlad et al. |
| 2004/0267839 A1 | 12/2004 | Mendonca et al. |
| 2005/0010732 A1 | 1/2005 | Boyd et al. |
| 2005/0010843 A1 | 1/2005 | Iwamitsu et al. |
| 2005/0015554 A1 | 1/2005 | Zohar et al. |
| 2005/0021591 A1 | 1/2005 | Boyd et al. |
| 2005/0033756 A1 | 2/2005 | Kottomtharayil et al. |
| 2005/0044114 A1 | 2/2005 | Kottomtharayil et al. |
| 2005/0050271 A1 | 3/2005 | Honda et al. |
| 2005/0060613 A1 | 3/2005 | Cheng |
| 2005/0076184 A1 | 4/2005 | Schumacher |
| 2005/0091311 A1 | 4/2005 | Lund et al. |
| 2005/0091646 A1 | 4/2005 | Chilimbi et al. |
| 2005/0097283 A1 | 5/2005 | Karlsson et al. |
| 2005/0108247 A1 | 5/2005 | Heinla et al. |
| 2005/0114562 A1 | 5/2005 | Barnes et al. |
| 2005/0114728 A1 | 5/2005 | Aizawa et al. |
| 2005/0120093 A1 | 6/2005 | Nakano et al. |
| 2005/0172073 A1 | 8/2005 | Voigt |
| 2005/0174869 A1 | 8/2005 | Kottomtharayil et al. |
| 2005/0188109 A1 | 8/2005 | Shiga et al. |
| 2005/0188253 A1 | 8/2005 | Kawamura et al. |
| 2005/0188263 A1 | 8/2005 | Gross et al. |
| 2005/0198455 A1 | 9/2005 | Yagawa |
| 2005/0210321 A1 | 9/2005 | Bai et al. |
| 2005/0228875 A1 | 10/2005 | Monitzer et al. |
| 2005/0243611 A1 | 11/2005 | Lubbers et al. |
| 2005/0246376 A1 | 11/2005 | Lu et al. |
| 2005/0254456 A1 | 11/2005 | Sakai |
| 2005/0257062 A1 | 11/2005 | Ignatius et al. |
| 2005/0268068 A1 | 12/2005 | Ignatius et al. |
| 2005/0278394 A1 | 12/2005 | Oks et al. |
| 2006/0005074 A1 | 1/2006 | Yanai et al. |
| 2006/0010341 A1 | 1/2006 | Kodama |

(56) References Cited

U.S. PATENT DOCUMENTS

| | | |
|---|---|---|
| 2006/0031594 A1 | 2/2006 | Kodama |
| 2006/0047931 A1 | 3/2006 | Sakai |
| 2006/0092861 A1 | 5/2006 | Corday et al. |
| 2006/0107089 A1 | 5/2006 | Jansz et al. |
| 2006/0171315 A1 | 8/2006 | Choi et al. |
| 2006/0174075 A1 | 8/2006 | Sutoh |
| 2006/0206662 A1 | 9/2006 | Ludwig et al. |
| 2006/0215564 A1 | 9/2006 | Breitgand et al. |
| 2006/0224846 A1 | 10/2006 | Amarendran et al. |
| 2006/0285523 A1 | 12/2006 | Ishii et al. |
| 2007/0033368 A1 | 2/2007 | Taguchi et al. |
| 2007/0033437 A1 | 2/2007 | Kawamura |
| 2007/0050547 A1 | 3/2007 | Sano |
| 2007/0050686 A1 | 3/2007 | Keeton et al. |
| 2007/0055737 A1 | 3/2007 | Yamashita et al. |
| 2007/0067586 A1 | 3/2007 | Mikami |
| 2007/0088702 A1 | 4/2007 | Fridella et al. |
| 2007/0130373 A1 | 6/2007 | Kalwitz |
| 2007/0136402 A1 | 6/2007 | Grose et al. |
| 2007/0198802 A1 | 8/2007 | Kavuri |
| 2007/0226535 A1 | 9/2007 | Gokhale |
| 2007/0260609 A1 | 11/2007 | Tulyani |
| 2007/0260834 A1 | 11/2007 | Kavuri et al. |
| 2007/0271570 A1 | 11/2007 | Brown et al. |
| 2008/0033991 A1 | 2/2008 | Basak et al. |
| 2008/0059704 A1 | 3/2008 | Kavuri |
| 2008/0091738 A1 | 4/2008 | Devraj et al. |
| 2008/0114815 A1 | 5/2008 | Sutoh |
| 2008/0126704 A1 | 5/2008 | Ulrich et al. |
| 2008/0147878 A1 | 6/2008 | Kottomtharayil et al. |
| 2008/0177694 A1 | 7/2008 | Chaudhuri et al. |
| 2008/0177970 A1 | 7/2008 | Prahlad et al. |
| 2008/0177971 A1 | 7/2008 | Prahlad et al. |
| 2008/0205301 A1 | 8/2008 | Burton et al. |
| 2008/0228987 A1 | 9/2008 | Yagi |
| 2008/0250178 A1 | 10/2008 | Haustein et al. |
| 2008/0301504 A1 | 12/2008 | Chen et al. |
| 2008/0313497 A1 | 12/2008 | Hirakawa |
| 2009/0013014 A1 | 1/2009 | Kern |
| 2009/0037585 A1 | 2/2009 | Miloushev et al. |
| 2009/0089499 A1 | 4/2009 | Abe |
| 2009/0113056 A1 | 4/2009 | Tameshige et al. |
| 2009/0164698 A1 | 6/2009 | Ji et al. |
| 2009/0300412 A1 | 12/2009 | Soran et al. |
| 2009/0327854 A1 | 12/2009 | Chhajer et al. |
| 2010/0010968 A1 | 1/2010 | Redlich et al. |
| 2010/0058012 A1 | 3/2010 | Okada et al. |
| 2010/0070726 A1 | 3/2010 | Namikawa et al. |
| 2010/0138391 A1 | 6/2010 | Namikawa et al. |
| 2010/0293112 A1 | 11/2010 | Namikawa et al. |
| 2010/0312979 A1 | 12/2010 | Kavuri et al. |
| 2011/0010518 A1 | 1/2011 | Kavuri et al. |
| 2011/0082837 A1 | 4/2011 | Cherkasova et al. |
| 2011/0202504 A1 | 8/2011 | Cherkasova et al. |
| 2011/0219035 A1 | 9/2011 | Korsunsky et al. |
| 2011/0295811 A1 | 12/2011 | Cherkasova et al. |
| 2012/0042122 A1 | 2/2012 | Beniyama et al. |
| 2012/0078846 A1 | 3/2012 | Gold et al. |
| 2012/0084501 A1 | 4/2012 | Watanabe et al. |
| 2012/0191900 A1 | 7/2012 | Kunimatsu et al. |
| 2012/0233417 A1 | 9/2012 | Kalach et al. |
| 2012/0297156 A1 | 11/2012 | Suzuki et al. |
| 2013/0054539 A1 | 2/2013 | Kaldas et al. |
| 2013/0124734 A1 | 5/2013 | Kavuri |
| 2013/0191681 A1 | 7/2013 | Moiseev et al. |
| 2013/0346709 A1 | 12/2013 | Wang |
| 2014/0019807 A1 | 1/2014 | Harrison et al. |
| 2014/0040573 A1 | 2/2014 | Cherkasova et al. |
| 2014/0101093 A1 | 4/2014 | Lanphear et al. |
| 2014/0201170 A1 | 7/2014 | Vijayan et al. |
| 2015/0261832 A1 | 9/2015 | Sinha et al. |
| 2015/0278329 A1 | 10/2015 | Hrle et al. |
| 2015/0304709 A1 | 10/2015 | Zhang et al. |
| 2015/0381433 A1* | 12/2015 | Kimura ................ H04L 41/20 709/224 |
| 2016/0350391 A1 | 12/2016 | Vijayan et al. |
| 2016/0353172 A1 | 12/2016 | Miller et al. |
| 2016/0357789 A1 | 12/2016 | Contessa et al. |
| 2016/0371180 A1 | 12/2016 | Urmanov et al. |
| 2017/0075749 A1* | 3/2017 | Ambichl ............ G06F 11/0712 |
| 2017/0168903 A1 | 6/2017 | Dornemann et al. |
| 2017/0185488 A1 | 6/2017 | Kumarasamy et al. |
| 2017/0193003 A1 | 7/2017 | Vijayan et al. |
| 2017/0235622 A1* | 8/2017 | Boyapalle ........... G06F 11/3065 714/47.2 |
| 2017/0235647 A1 | 8/2017 | Kilaru et al. |
| 2017/0242871 A1 | 8/2017 | Kilaru et al. |
| 2017/0308449 A1 | 10/2017 | Mangione-Tran et al. |
| 2017/0357553 A1 | 12/2017 | Zhao et al. |
| 2018/0165033 A1 | 6/2018 | Baig et al. |
| 2019/0095272 A1 | 3/2019 | Haridas et al. |
| 2019/0121673 A1 | 4/2019 | Gold et al. |
| 2019/0179715 A1 | 6/2019 | Thanasekaran |
| 2019/0278498 A1 | 9/2019 | Dedrick |
| 2019/0356609 A1 | 11/2019 | Grunwald et al. |
| 2020/0034745 A1 | 1/2020 | Nagpal et al. |
| 2020/0192572 A1 | 6/2020 | Dwarampudi et al. |
| 2020/0233589 A1 | 7/2020 | Prahlad et al. |
| 2020/0264966 A1 | 8/2020 | Kochunni et al. |
| 2020/0319956 A1 | 10/2020 | Upadhyay |
| 2021/0271388 A1 | 9/2021 | Dwarampudi et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 1999/012098 | 3/1999 |

OTHER PUBLICATIONS

Armstead et al., "Implementation of a Campus-Wide Distributed Mass Storage Service: The Dream vs. Reality," IEEE, 1995, pp. 190-199.

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

"How to troubleshoot a handle leak?" from Yong Rhee's Microsoft Technet Blog at http://blogs.technet.microsoft.com/yongrhee/2011/12/19/how-to-troubleshoot-a-handle-leak/, retrieved on Dec. 8, 2017, in 23 pages.

Jander, "Launching Storage-Area Net," Data Communications, US, McGraw Hill, NY, vol. 27, No. 4(Mar. 21, 1998), pp. 64-72.

Rosenblum et al., "The Design and Implementation of a Log-Structure File System," Operating Systems Review SIGOPS, vol. 25, No. 5, New York, US, pp. 1-15 (May 1991).

"Windows Leaks Detector" from http://winleak.sourceforge.net/, retrieved on Oct. 10, 2017, in 3 pages.

European Examination Report Application No. 05745272.4, dated Jun. 28, 2010.

International Search Report, PCT/US2005/015202, dated Dec. 5, 2006.

Supplementary European Search Report, EP 05745272.2, dated Mar. 16, 2010, 3 pages.

Office Action in Canadian Application No. 2,564,967 dated Aug. 8, 2012.

(56) References Cited

OTHER PUBLICATIONS

Office Action in European Application No. 05745272.4 dated Sep. 9, 2015.

* cited by examiner

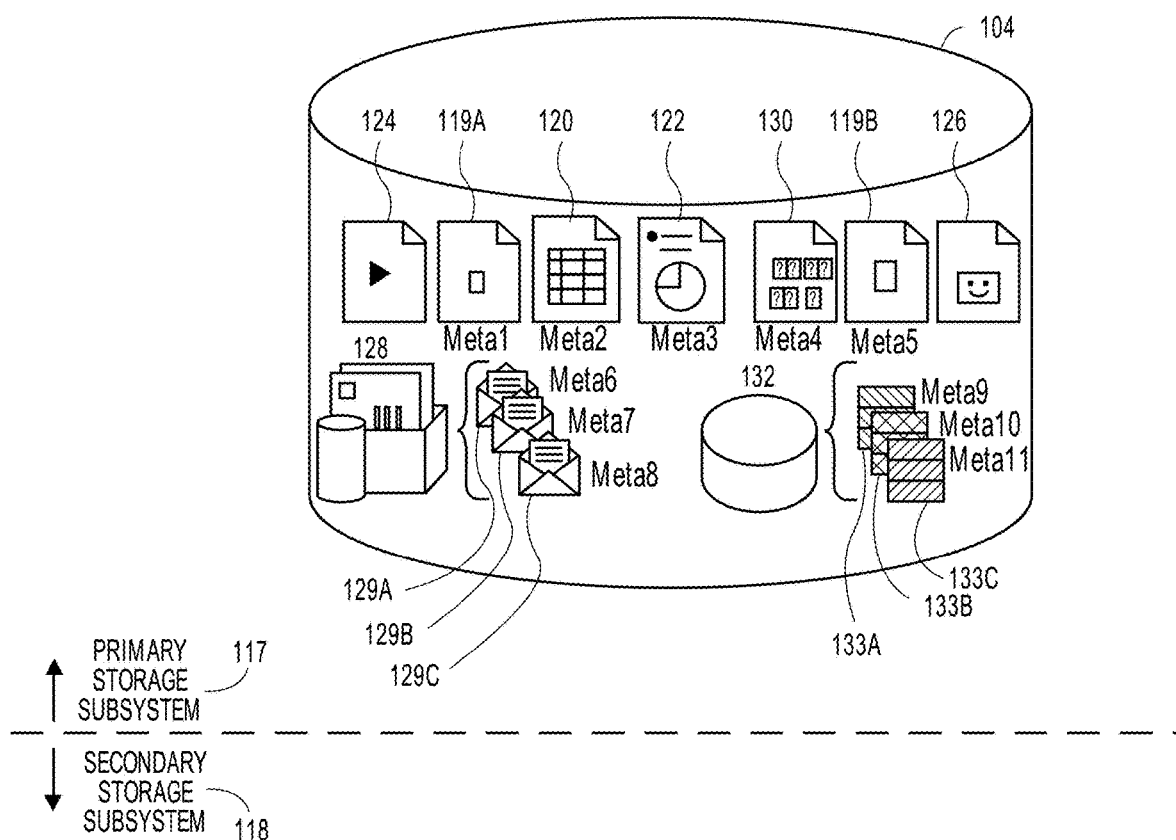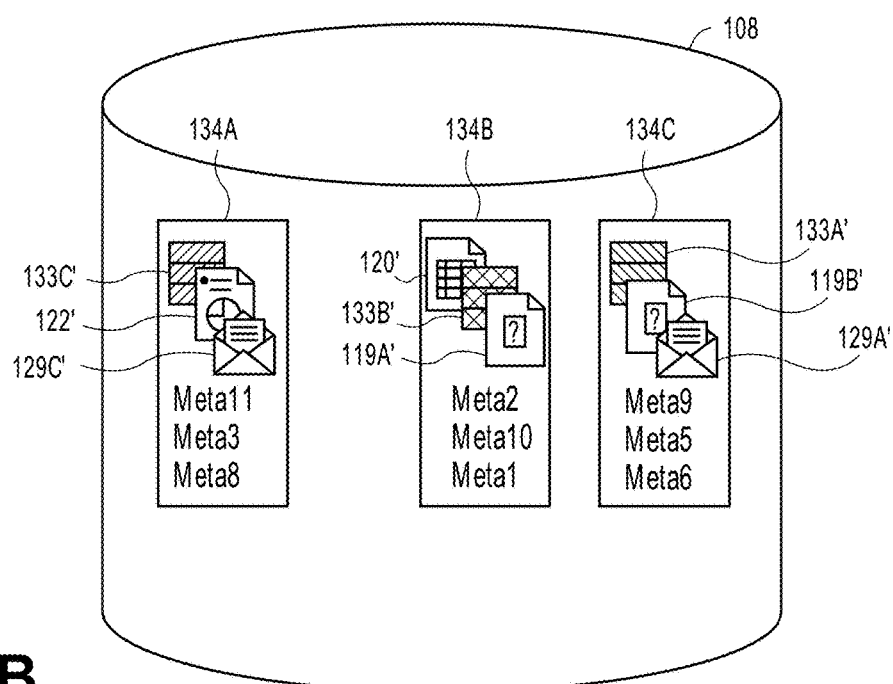
FIG. 1B

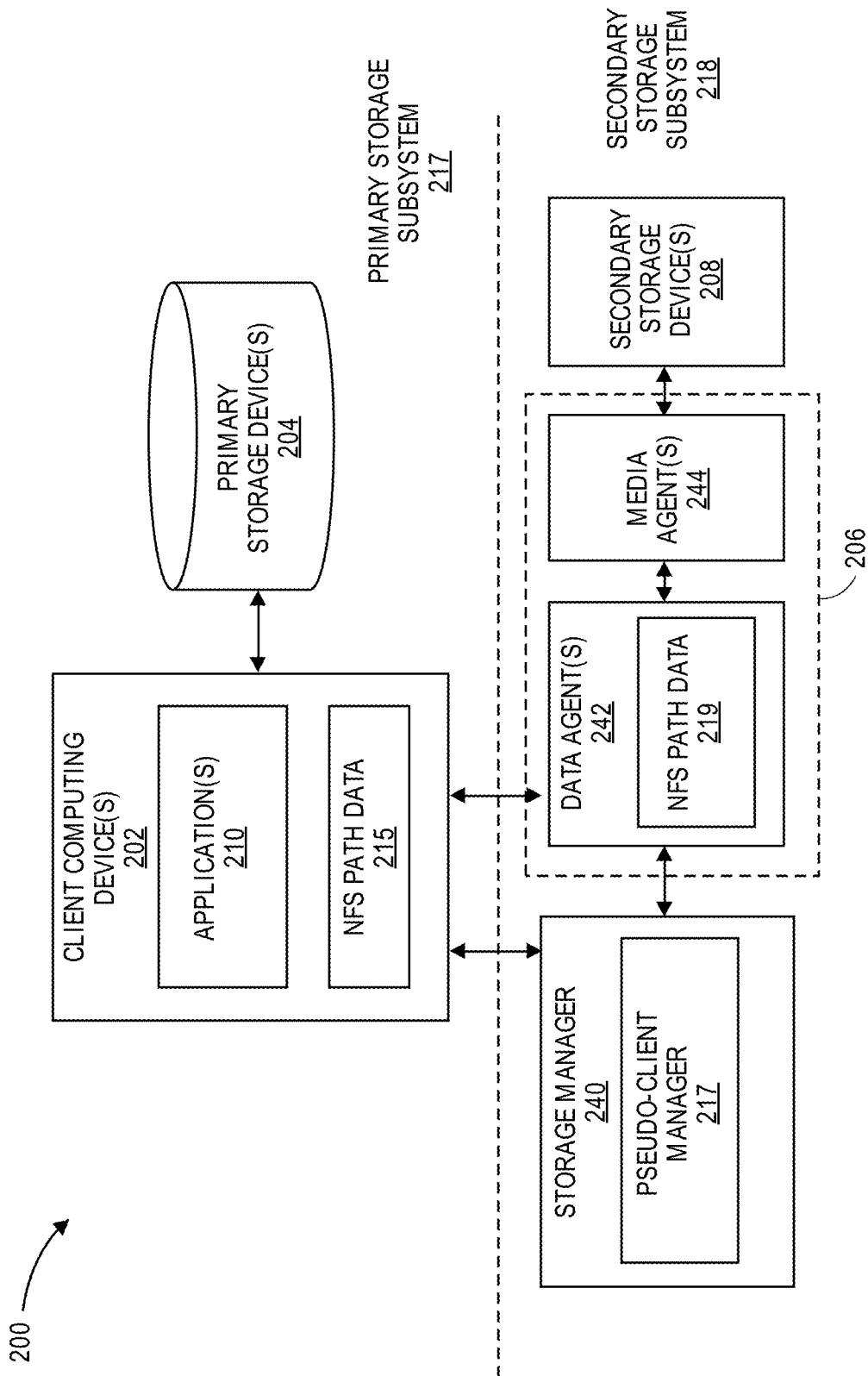

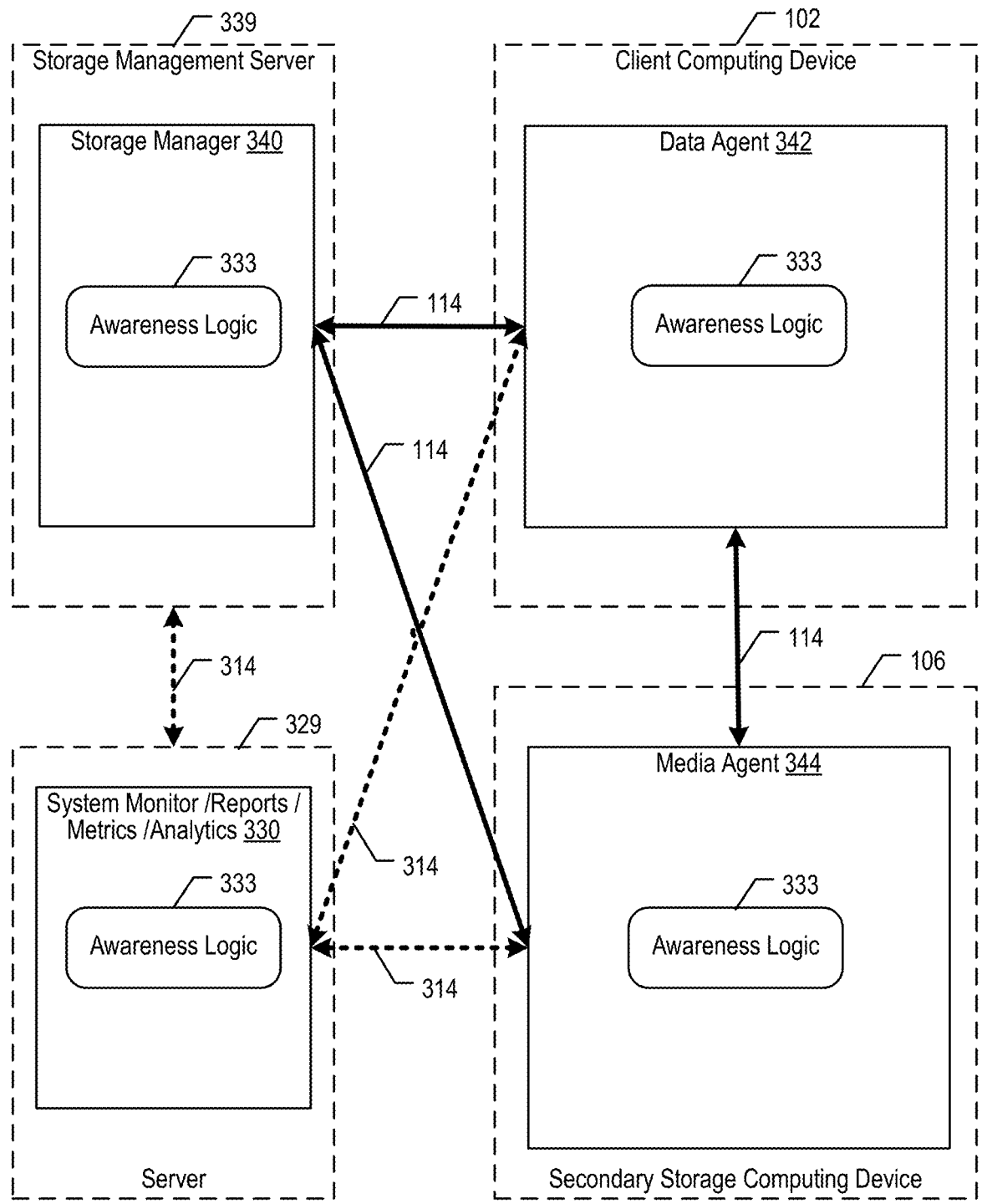
FIG. 3 System 300 For Taking Remedial Action Based On Maintaining Process Awareness In Data Storage Management Illustrative Threshold Function for Block 506
e.g., 1/log(log(v))

Where:
log is the logarithm; and
v is the value of the vital stat (e.g., memory size, handle count, CPU usage, etc.).

v = Value Or Measure Of Vital Stat Within Longer-term *N* Sliding Window
(e.g., Memory Size, CPU Usage, Handle Count, Etc.)

REMEDIAL ACTION BASED ON MAINTAINING PROCESS AWARENESS IN DATA STORAGE MANAGEMENT

INCORPORATION BY REFERENCE TO ANY PRIORITY APPLICATIONS

This application is a Continuation of U.S. patent application Ser. No. 16/906,424 files on Jun. 19, 2020, which is a Continuation of U.S. patent application Ser. No. 15/868,948 filed on Jan. 11, 2018, now U.S. Pat. No. 10,831,591 with the title of "Remedial Action Based On Maintaining Process Awareness In Data Storage Management," all of which are incorporated by reference herein. Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. Protecting the integrity of the systems that protect the data is also an ongoing need.

SUMMARY

Because of the importance of protecting data, data storage management processes that are involved in data protection are key resources, which need to operate optimally and reliably. When data storage processes fail, the data they are meant to protect is put at risk. The present inventor devised a solution that maintains process awareness and takes remedial action when necessary relative to data storage management processes and other processes they interoperate with. The illustrative data storage management system comprises a number of software-implemented components that are hosted by and run on a variety of computing devices, such as, illustratively, client computing devices, servers, secondary storage computing devices, etc., whether implemented in traditional or virtualized data networks/centers.

An illustrative data storage management system comprises "awareness logic" that executes on computing devices that host one or more storage management components such as storage manager, data agent, media agent, system monitor, system reporter, system metrics, system analytics, etc. The illustrative awareness logic operates within each of these illustrative components, e.g., as a thread within certain processes that execute within the storage management component, such as storage management core process, file identifier process, log monitoring process, etc.

The awareness logic monitors the targeted process over time and triggers remedial (corrective) action when certain criteria are met. On any given computing device that hosts a storage management component, the illustrative awareness logic is additionally deployed to target other processes that interoperate with and/or can affect the operation of the storage management component. Thus, the illustrative awareness logic acts as a "self-awareness" feature of storage management processes and as an "external awareness" feature targeting other processes co-resident on and co-hosted by the same computing device.

Certain vital statistics of each process are collected periodically and analyzed by the illustrative awareness logic, such as CPU usage, memory usage, and handle counts. The historical data points are maintained by the illustrative awareness logic in a local sliding window, e.g., several hours' data points collected every five minutes. Criteria for corrective action include rising trends based on local minima data points for one or more vital statistics of the process. Because the local minima represent best-case performance points, when these progressively trend higher over time, the process is likely leaking resources. Other criteria for corrective action include exceeding a threshold based on a logarithm function of the collected data points in the sliding window. Accordingly, processes with a historically small footprint (in terms of their vital statistics) are given wide latitude to vary and spike over time, since the small footprint still leaves plenty of "room" for other co-hosted processes to be executed by the host computing device. On the other hand, in order to protect and set aside computing resources needed by other co-resident/co-hosted processes, processes with a historically large footprint (in terms of their vital statistics) are given less freedom to vary over time and are more likely to exceed the logarithm threshold function. When a process is deemed to be performing unacceptably (out of bounds, abnormally), its current vital statistics data points are kept out of the sliding window to prevent the data therein from becoming polluted.

Corrective (remedial) action includes taking core dumps, raising alarms, lowering process priorities, killing and restarting processes, among others. Certain essential processes, such as the illustrative storage management core process, are not killed or lowered in priority due to their key role in sustaining and operating the data storage management system. Non-essential processes can be lowered in priority or even killed and restarted when they meet the criteria for corrective (remedial) action. Although the illustrative data storage management system and the awareness logic executing therein illustratively do not identify the root cause that might have caused a targeted process to go "out of bounds," the core dump(s) and alarms that are generated will give product developers and others an opportunity to examine the core dump(s) and the current vital statistics data points to better understand what is happening in the system and in the particular targeted process that went "out of bounds." In sum, the illustrative system enables remedial action to be taken based on maintaining process awareness in and interoperating with data storage management components and processes.

The illustrative embodiments comprise data storage management examples, e.g., processes, components, etc., but the invention is not so limited. Any kind of process that executes on a computing device, whether in a traditional hardware or virtualized configuration, can be enhanced with the illustrative awareness logic and the techniques described herein for maintaining process awareness within the process and with regard to other processes that interact with it on the host computing device.

BRIEF DESCRIPTION OF THE DRAWINGS

FIG. 1B is a detailed view of a primary storage device, a secondary storage device, and some examples of primary data and secondary copy data.

FIG. 2B illustrates an information management system architecture incorporating use of a network file system (NFS) protocol for communicating between the primary and secondary storage subsystems.

FIG. 3 is a block diagram illustrating some salient portions of a system 300 for taking remedial action based on maintaining process awareness in data storage management.

DETAILED DESCRIPTION

Detailed descriptions and examples of systems and methods according to one or more illustrative embodiments of the present invention may be found in the section entitled REMEDIAL ACTION BASED ON MAINTAINING PROCESS AWARENESS IN DATA STORAGE MANAGEMENT, as well as in the section entitled Example Embodiments, and also in FIGS. 3-11 herein.

Furthermore, components and functionality for taking remedial action based on maintaining process awareness in data storage management systems may be configured and/or incorporated into information management systems such as those described herein in FIGS. 1A-1H and 2A-2C.

Various embodiments described herein are intimately tied to, enabled by, and would not exist except for, computer technology. For example, maintaining and analyzing the vital statistics of numerous active computer-based processes executing on a variety of computing devices described herein in reference to various embodiments cannot reasonably be performed by humans alone, without the computer technology upon which they are implemented.
Information Management System Overview With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
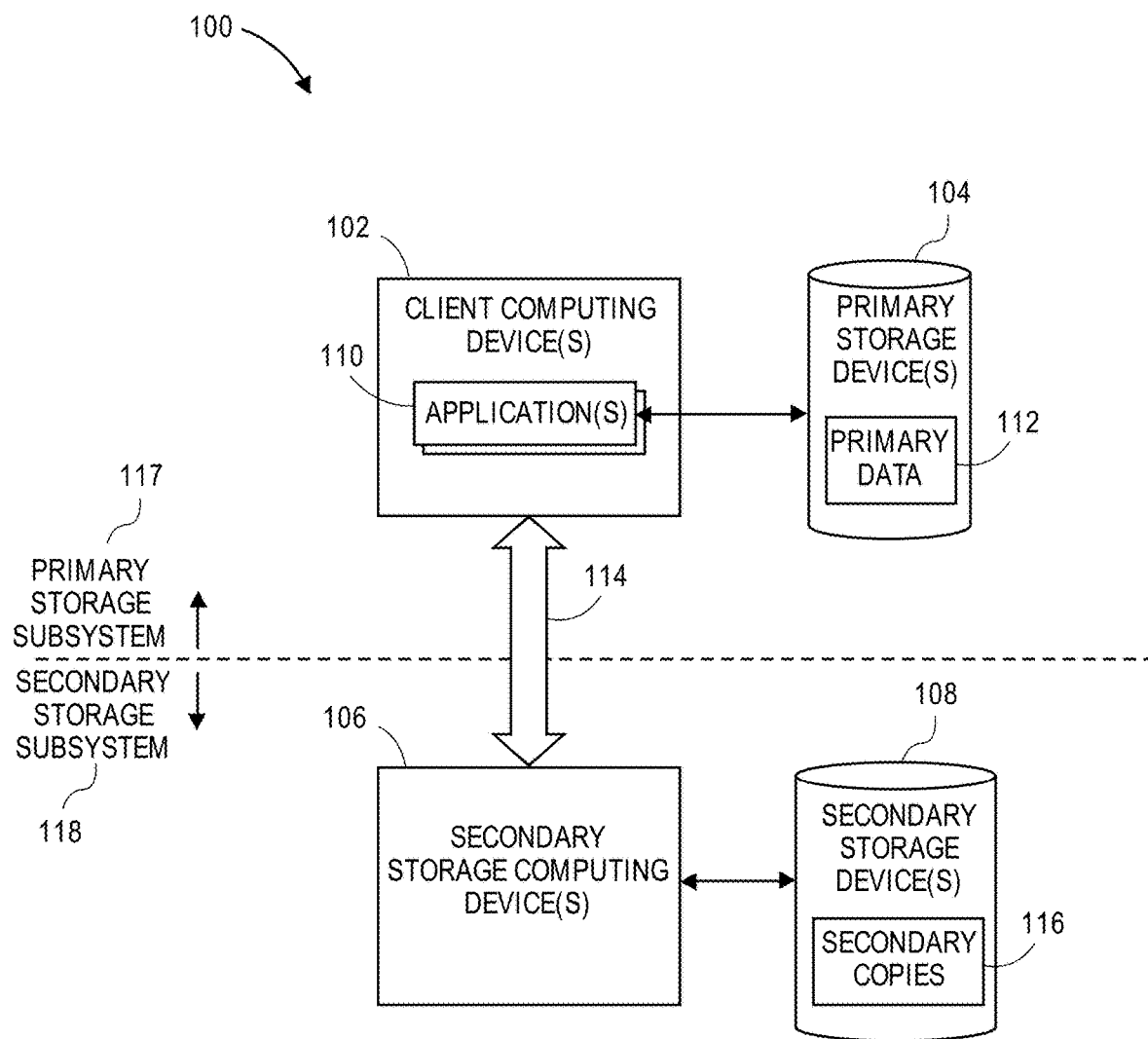
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations";

U.S. Pat. Pub. No. 2014/0201170, entitled "High Availability Distributed Deduplicated Storage System";

U.S. patent application Ser. No. 14/721,971, entitled "Replication Using Deduplicated Secondary Copy Data";

U.S. patent application Ser. No. 15/365,756 entitled "Live Synchronization And Management Of Virtual Machines Across Computing And Virtualization Platforms And Using Live Synchronization To Support Disaster Recovery";

U.S. Patent Application No. 62/273,286 entitled "Redundant and Robust Distributed Deduplication Data Storage System" and child cases claiming priority thereto;

U.S. patent application Ser. No. 15/283,033, entitled "Data Protection Operations Based on Network Path Information";

U.S. patent application Ser. No. 15/286,403, entitled "Data Restoration Operations Based on Network Path Information"; and U.S. patent application Ser. No. 15/369,676, entitled "Application-Level Live Synchronization Across Computing Platforms Including Synchronizing Co-Resident Applications To Disparate Standby Destinations And Selectively Synchronizing Some Applications And Not Others."

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
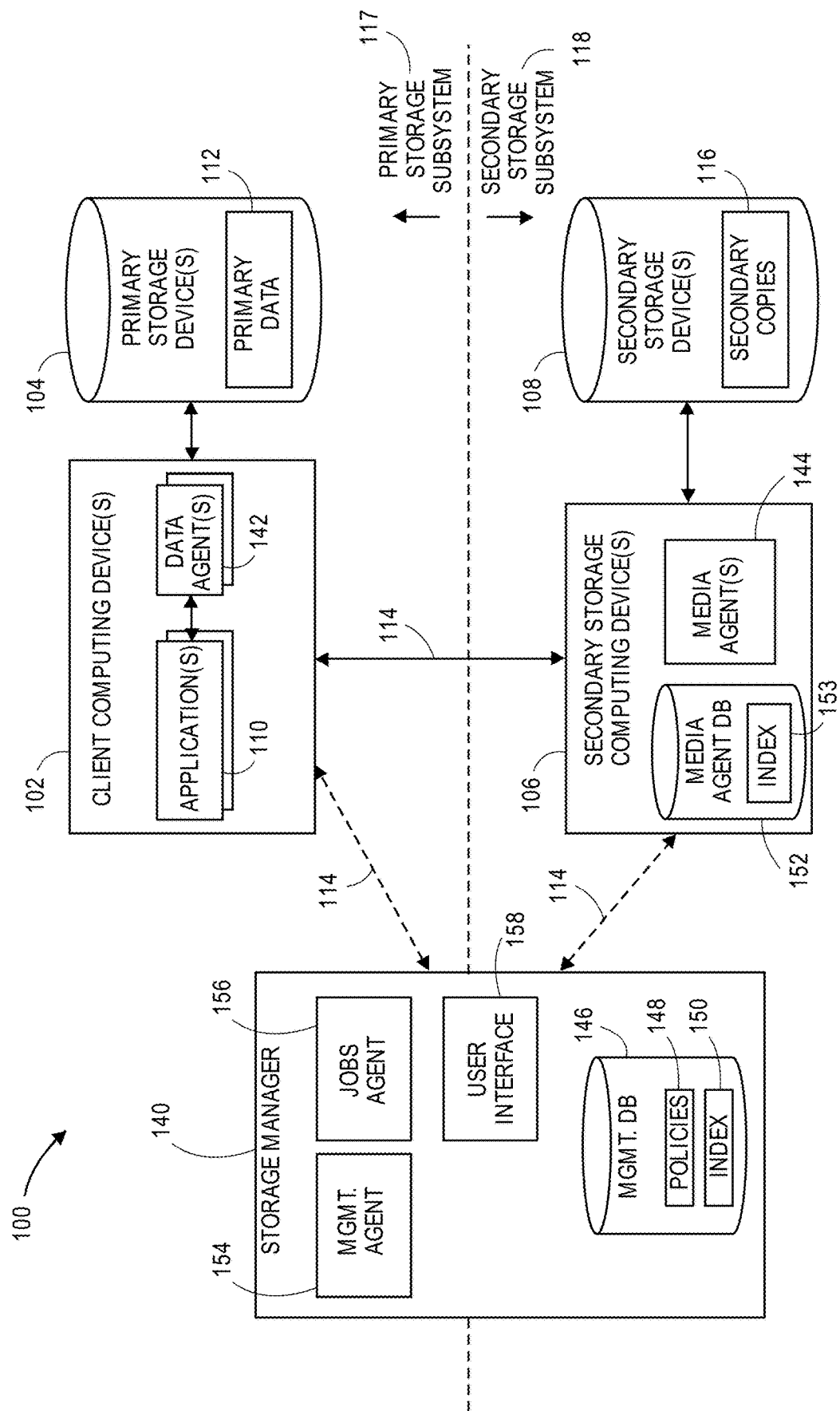
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, Share Point data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
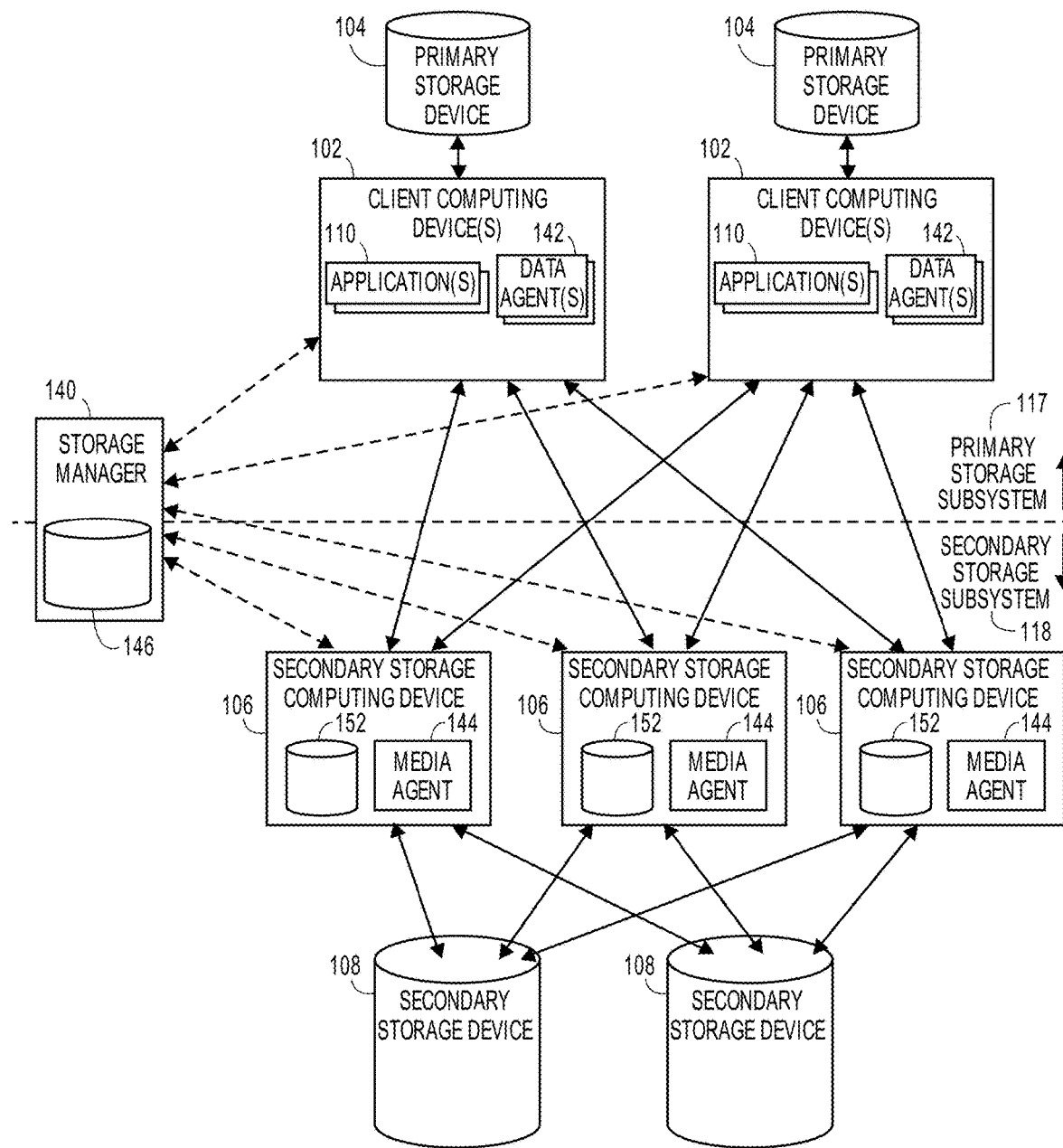
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No.

8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
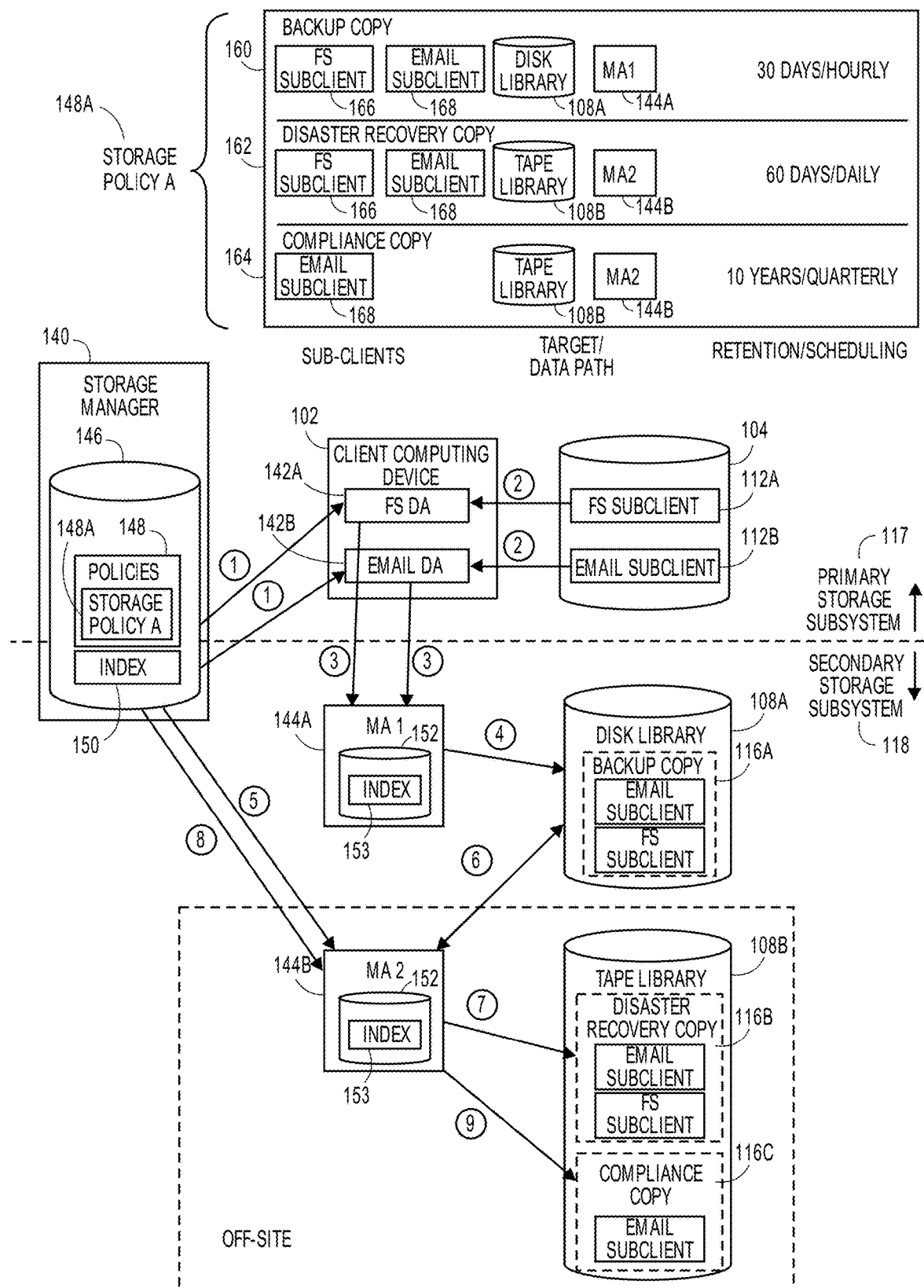
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
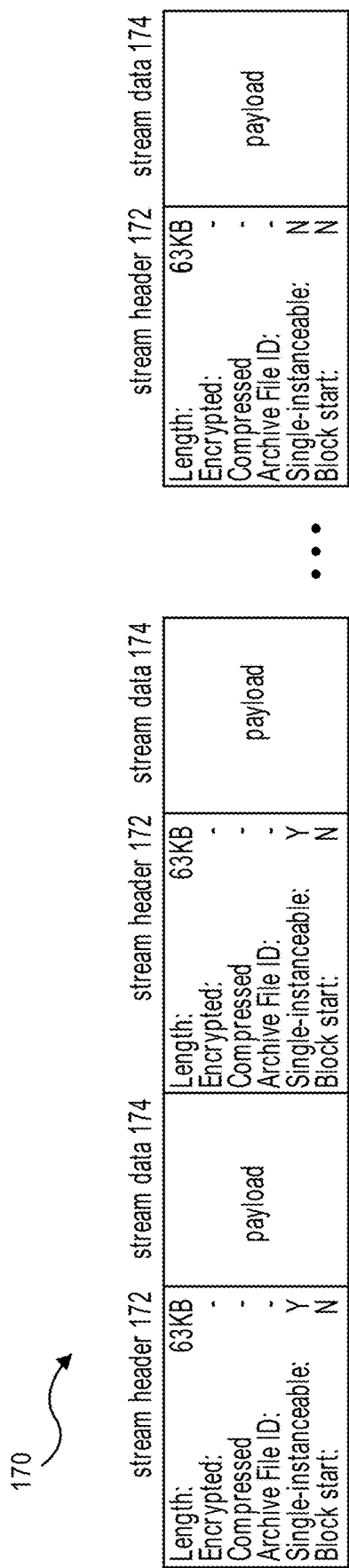
FIGS. 1F-1H are block diagrams illustrating suitable data structures that may be employed by the information management system.
Figure 1G:
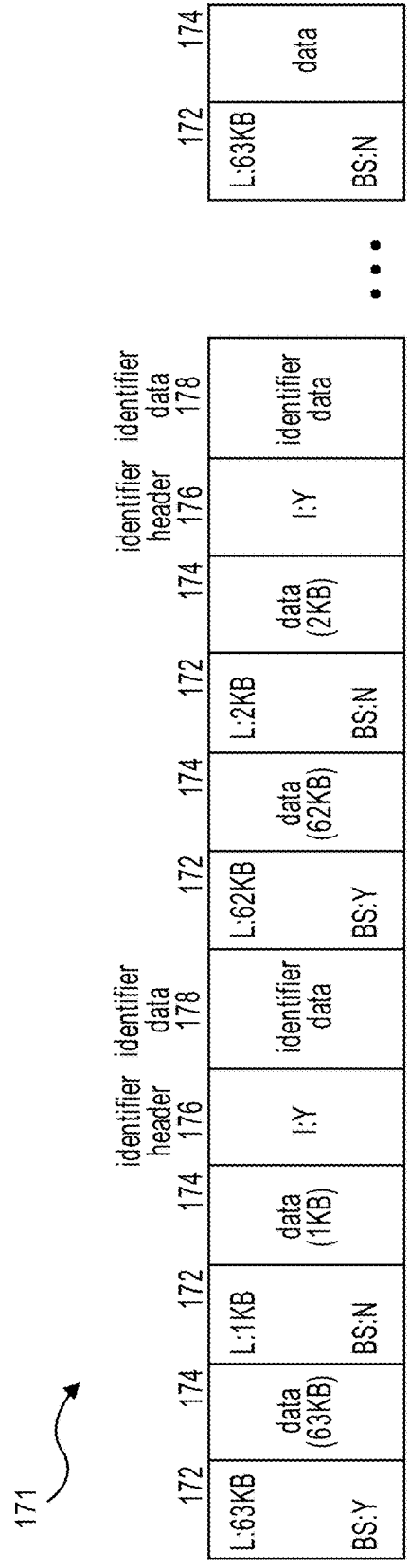

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
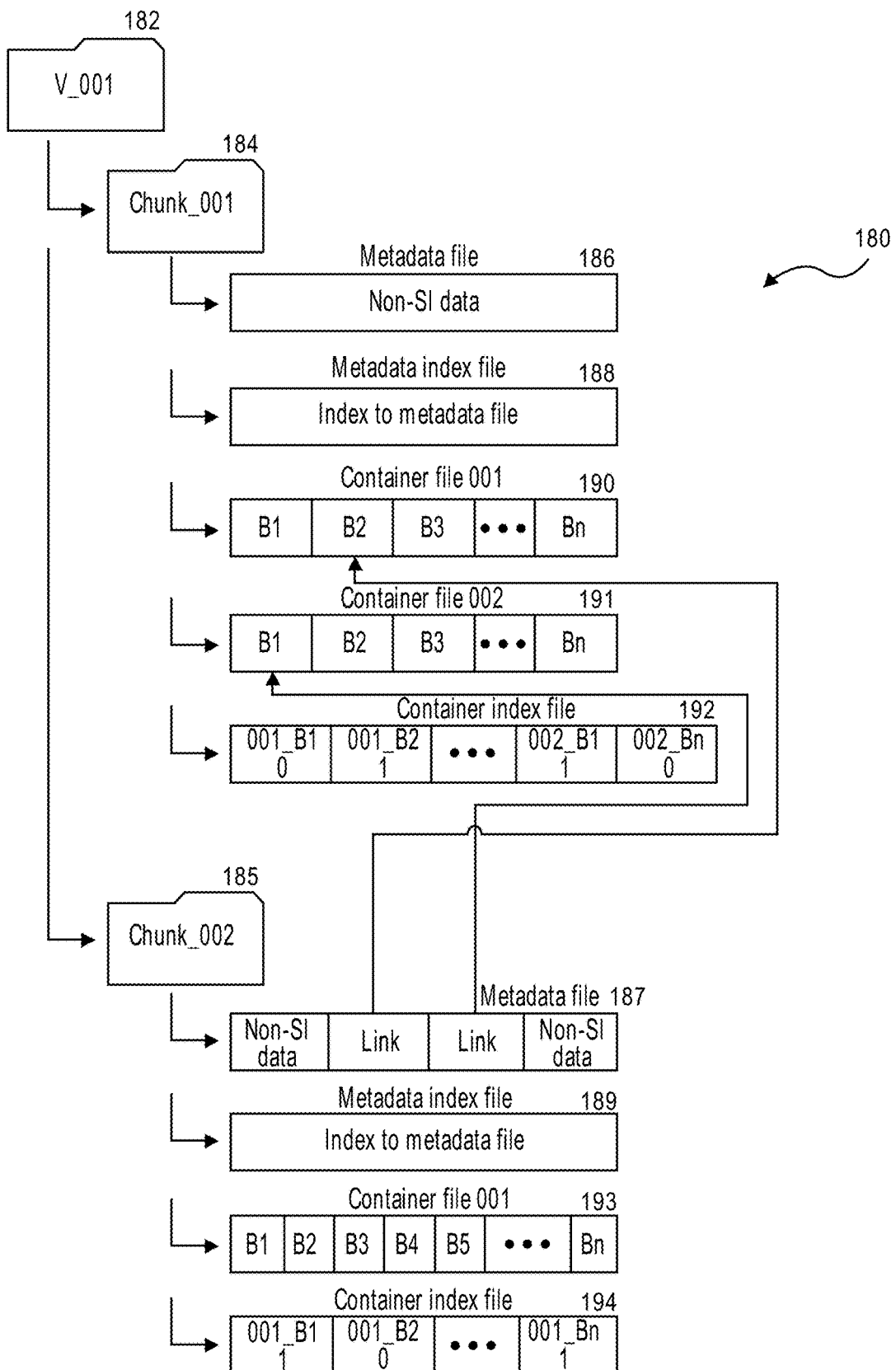

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
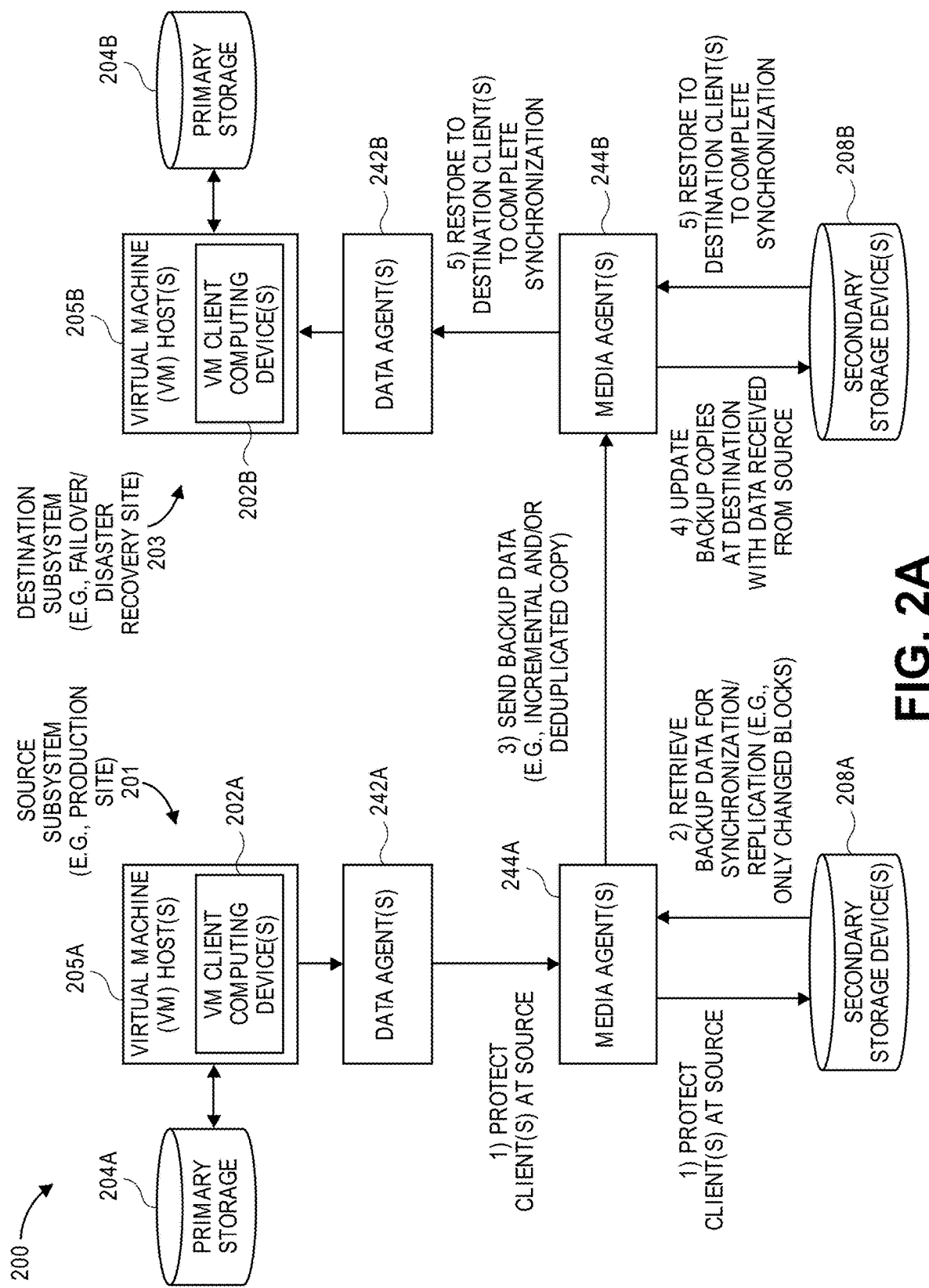
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
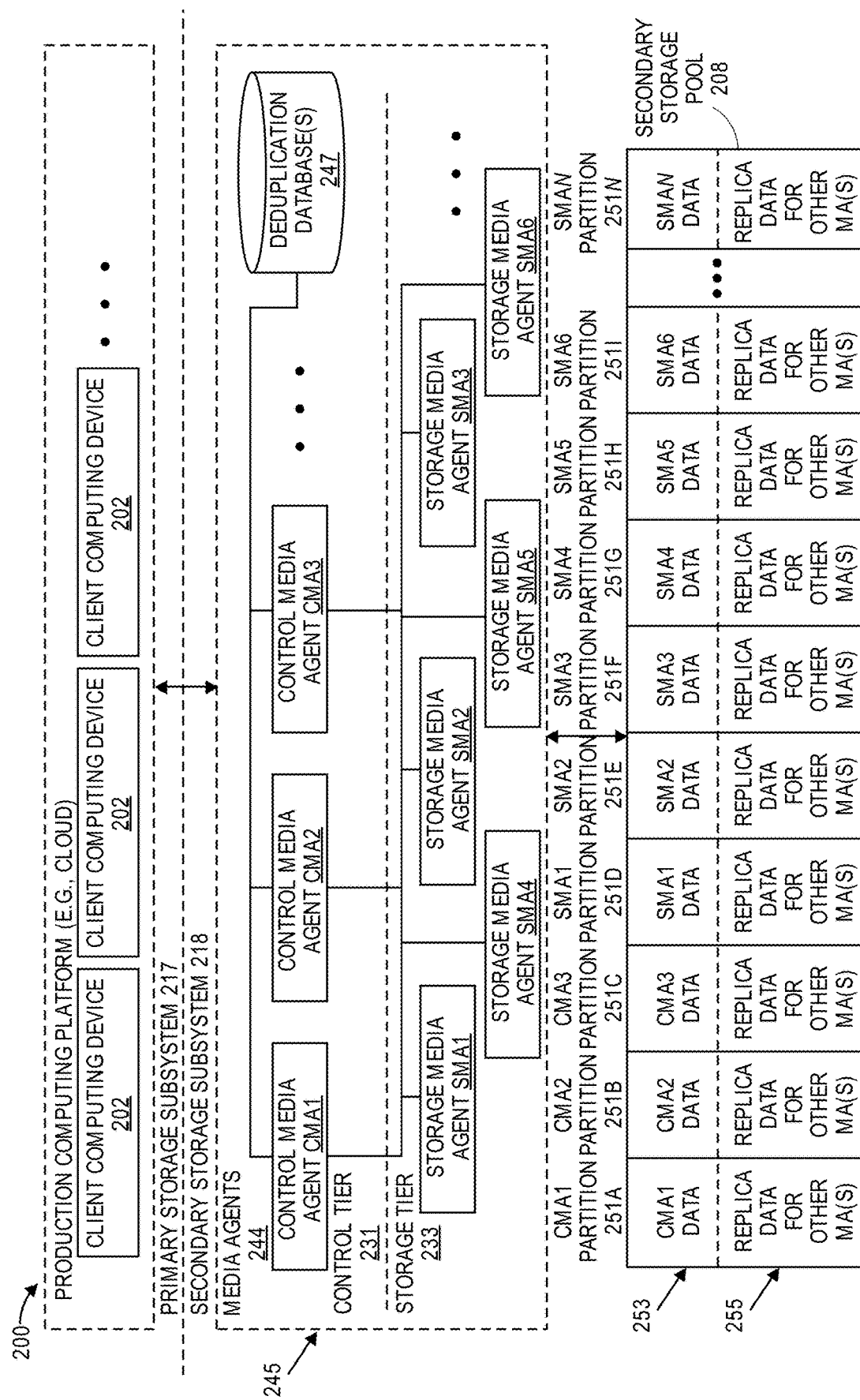
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Remedial Action Based on Maintaining Process Awareness in Data Storage Management The illustrative embodiments, including the figures herein, comprise data storage management examples, e.g., processes, components, systems, etc., but the present invention is not so limited. Any kind of process that executes on a computing device, whether in a traditional hardware or virtualized configuration, can be enhanced with the illustrative awareness logic and the techniques described herein for maintaining process awareness within the process and with regard to other processes that interact with it on the host computing device.

FIG. 3 is a block diagram illustrating some salient portions of a system 300 for taking remedial action based on maintaining process awareness in data storage management. As depicted here, system 300 comprises: client computing device 102 hosting one or more data agents 342, each of which comprises at least one instance of awareness logic 333; secondary storage computing device 106 hosting one or more media agents 344, each of which comprises at least one instance of awareness logic 333; one or more servers 329 each of which hosts storage management application(s) 330 (e.g., system monitor, reports, metrics, analytics, etc.) each of which comprises at least one instance of awareness logic 333; and server 339 hosting storage manager 340 comprising at least one instance of awareness logic 333. Logical views of communication pathways 114 among storage manager 340, data agent 342, and media agent 344 are depicted by solid bi-directional arrows. Additional logical views of communication pathways 314 among the storage management applications 330 and the other components are depicted by dotted bi-directional arrows. The underlying physical communications infrastructure required to support these communications pathways 114 and 314 is well known in the art, as described in more detail in regard to pathways 114. The depicted components need not be geographically co-located. System 300 is a data storage management system analogous to system 100 described in more detail herein, and additionally comprises enhanced functionality for taking remedial action based on maintaining process awareness in data storage management operations that take place within system 300.

Server 329 is a computing device comprising one or more hardware processors and corresponding computer memory. Illustratively, server 329 hosts one or more storage management applications 330, such as system monitoring, reporting, metrics, analytics. Any number of servers 329 can be configured within system 300.

Applications 330 generally comprise one or more storage management data applications that are directed at system 300 as a whole, and which perform certain functions in regard to system 300. Examples include system monitoring, reporting, metrics, analytics, which are not mutually exclusive and may be combined in some embodiments. In general, applications 330 do not manage storage management operations in system 300, and instead are responsible for other functions that are well known in the art, e.g., storing system reports, calculating and keeping system metrics, performing analytics of system data and system operations, monitoring the performance of certain components, etc. In contrast to application 330, storage manager 340 is responsible for managing the storage management operations occurring in system 300. Although the non-management functions of applications 330 are well known in the art, the awareness functionality provided by awareness logic 333 is an enhancement according to the illustrative embodiments of the present invention.

Awareness logic 333 is a functional feature of certain storage management components, e.g., applications 330, storage manager 340, data agent 342, and/or media agent 344. Awareness logic 333 is implemented as executable software (for example, as an object within the storage management component) which executes on the underlying computing device hosting the respective storage management component (e.g., 102, 106, 329, 339). In alternative embodiments, awareness logic 333 is implemented as firmware or as software and firmware in any combination. Any given storage management component (e.g., 330, 340, 342, 344) comprises at least one instance of awareness logic 333 (e.g., as an object), because each instance of awareness logic 333 is implemented within or in regard to a specific process that executes within the given component, e.g., log monitoring, core storage management, etc. Awareness logic 333 is generally responsible for targeting and monitoring its own process ("self-awareness"), determining whether the process requires remedial action, and triggering remedial action as needed and as appropriate to the nature of the targeted process. In some embodiments, awareness logic 333 that executes within a given a process for data storage management, e.g., storage management core process 454, is additionally configured to target one or more processes (e.g., 460) that execute outside of but interact with and/or can affect the operation of the storage management component. In this configuration, awareness logic 333 has "external awareness" in reference to these other outside processes that are not part of the storage management component. Accordingly, awareness logic 333 can detect abnormalities in vital statistics (e.g., memory usage, CPU usage, handles counts) of the targeted storage management processes and/or other processes that are co-resident on the same host computing device. In some embodiments, awareness logic 333 operates as a lightweight thread within a storage management process that it inhabits and is not a separate process therefrom.

Illustratively, awareness logic 333 periodically (e.g., every 5 minutes, every 10 minutes) collects the current vital statistics of the targeted process(es) and analyzes whether remedial action is required because of abnormal operations. Abnormalities are inferred from trends in vital statistics based on local minima. Thresholds are established from the vital statistics collected over a longer-term, so that the analysis is better calibrated to the longer-term performance of the targeted process in view of the process' relative size and variability in vital statistics. More details are given in other figures. When a process performs abnormally it is said to be "out of bounds" or "unacceptable." These terms are used interchangeably herein.

According to the illustrative embodiments, each instance of awareness logic 333 executes independently of any other instances on the same computing device (e.g., 102, 106, 329, 339) and/or in the same data storage management system 300. Thus, each instance of awareness logic 333 targets one or more particular processes (e.g., 454, 456, 458, 459, 460) and operates in relation to the targeted process(es). Therefore, each instance of awareness logic 333 operates with its own set of criteria, such as threshold functions and remedies, which are configured to be suitable to and relevant for the targeted process. Trending criteria and threshold functions differ in respect to the different vital statistics (e.g., CPU usage, memory usage, handle count) and also vary from target process to target process as appropriate. More details are given in subsequent figures.

Storage management server 339 is a computing device comprising one or more hardware processors and corresponding computer memory. Illustratively, server 339 hosts storage manager 340 and its associated management database 146 (not shown here). In some embodiments, server 339 can also host one or more data agents 342 and/or one or more media agents 344, without limitation.

Storage manager 340 is analogous to storage manager 140 described in further detail herein, and additionally comprises enhancements for operating in system 300, e.g., awareness logic 333.

Data agent 342 is analogous to data agent 142 described in more detail elsewhere herein, and additionally comprises enhancements for operating in system 300, e.g., awareness logic 333.

Media agent 344 is analogous to media agent 144 described in more detail elsewhere herein, and additionally comprises enhancements for operating in system 300, e.g., awareness logic 333.

Figure 4:
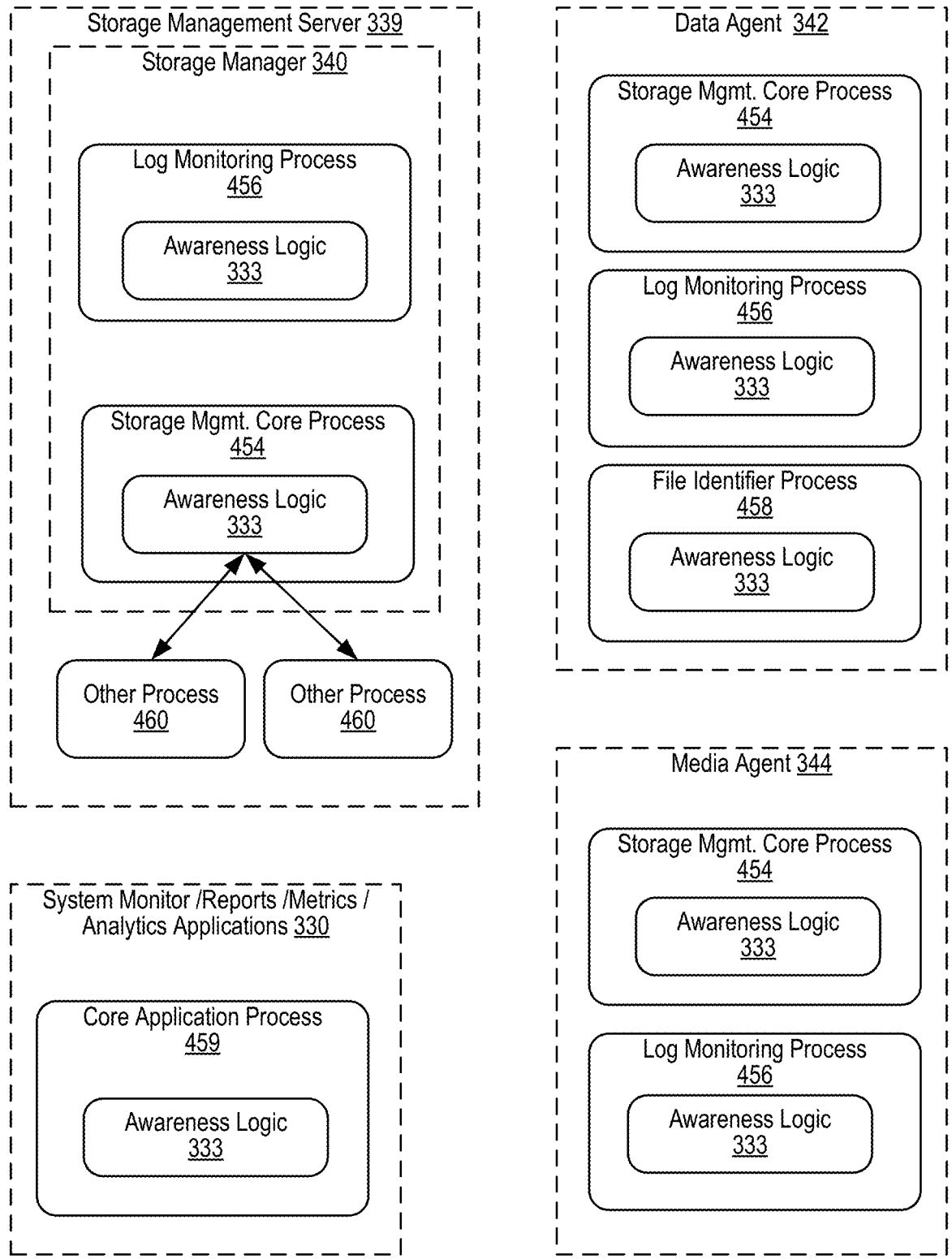
FIG. 4 is a block diagram illustrating certain details of system 300.

FIG. 4 is a block diagram illustrating certain details of system 300. FIG. 4 depicts: Applications 330, each one comprising a respective core application process comprising awareness logic 333; storage management server 339 hosting storage manager 340, which comprises storage management core process 454 comprising awareness logic 333, log monitoring process 456 comprising awareness logic 333, and at least one instance of an external process 460 hosted by storage management server 339 but not part of storage manager 340; data agent 342 comprising storage management core process 454 comprising awareness logic 333, log monitoring process 456 comprising awareness logic 333, and file identifier process 458 comprising awareness logic 333; and media agent 344 comprising storage management core process 454 comprising awareness logic 333 and log monitoring process 456. Illustratively, processes 454, 456, and 458 are collectively referred to as processes for data storage management.

Storage management core process 454 is a process generally responsible for one or more features of the storage management component it inhabits, e.g., storage manager 340, data agent 342, media agent 344. In some embodiments, storage management core process 454 is referred to as "cvd.exe." According to the illustrative embodiment, at least one instance of core storage management process 454 is present in every storage management component that is responsible for data protection (e.g., backup, index, restore, etc.) in system 300. Storage management core process 454 is responsible, among others, for maintaining communications among storage manager 340, data agent 342, and media agent 344; coordinating storage management jobs in system 300; maintaining a so-called data pipe(s) that move data around system 300 during storage management operations, etc. Illustratively, storage management core process 454 runs—and needs to run—all the time in order to protect the data being managed by system 300. Depending on the nature of the respective component, the core process 454 performs functions that are relevant to the storage management component, e.g., triggering a backup job at storage manager 340, e.g., by communicating with data agents 142/342 and/or media agents 144/344; quiescing a database at data agent 342; indexing backup copies at media agent 344; etc., without limitation. These functions are well known in the art and are part of the data storage management functionality provided by system 300 as well as system 100. Storage management core process 454 in some embodiments comprises functional sub-modules, such as management agent 154, jobs agent 156, user interface 156, etc., which are described in more detail elsewhere herein. By additionally comprising awareness logic 333, which actively executes when storage management core process 454 executes, storage management core process 454 is said to be "self-aware" or to have "self-awareness" in the context of the present invention. Illustratively, the instance of awareness logic 333 in storage management core logic 454 also targets other processes 460 thus providing storage management core process 454 with "external awareness" as well.

Log monitoring process 456 is a process generally responsible for logging (recording) activities performed by the associated storage management core process 454, and at least one instance thereof illustratively runs in storage manager 340, data agent 342, and media agent 344. For example, log monitoring process 456 includes one or more of: capturing log data from various sources; collecting log messages from multiple sources, such as Windows, Unix, system 300 logs; monitoring logs in real time; and/or analyzing logs based on log monitor policies that run at specific intervals and/or times of day. A number of system-generated logs are monitored by log monitoring process 456, such as text log files and other logs generated by storage manager 340, data agent 342, and/or media agent 344; management database 146 logs, such as audit trails, alerts, and/or event viewer logs; Windows operating system events such as system event and application event logs; and/or UNIX system logs; etc., without limitation. These functions are well known in the art and are part of the data storage management functionality provided by system 300 as well as system 100. By additionally comprising awareness logic 333, which actively executes when log monitoring process 456 executes, log monitoring process 456 is said to be "self-aware" or to have "self-awareness" in the context of the present invention. Accordingly, awareness logic 333 executes within each log monitoring process 456 as described in more detail in other figures, e.g., FIG. 5. Log monitoring process 456 illustratively checks its own vital statistics, thus being said to be "self-aware." In other embodiments (not shown), awareness logic 333 in log monitoring process 456 is configured to track processes external to log monitoring process 456, e.g., one or more Other Processes 460. To enhance the reader's understanding of the present disclosure, log monitoring process 456 is shown here as a process that is distinct from storage management core process 454, but in some embodiments, log monitoring process 456 executes as a thread within storage management core process 454. Furthermore, though log monitoring process 456 is shown in storage manager 340, data agent 342, and media agent 344, any one or more of these components can operate without log monitoring process 456, whether configured within or outside of storage management core process 454.

File identifier process 458 is a process that illustratively runs in data agent 342, and which is generally responsible for identifying which one or more data files to protect in a given secondary copy job, e.g., full backup, incremental backup, archiving, reference copy, etc. This involves determining which data files have changed since an earlier point in time and/or whether they are suitable for the present secondary copy job. These functions are well known in the art and are part of the data storage management functionality provided by system 300 as well as system 100. By additionally comprising awareness logic 333, which actively executes when file identifier process 458 executes, file identifier process 458 is said to be "self-aware" or to have "self-awareness" in the context of the present invention. Accordingly, awareness logic 333 executes within each file identifier process 458 as described in more detail in other figures, e.g., FIG. 5. To enhance the reader's understanding of the present disclosure, file identifier process 458 is shown here as a process that is distinct from storage management core process 454, but in some embodiments, file identifier process 458 executes as a thread within storage management core process 454.

Core application process 459 is a process that illustratively runs in a given application 330, and which is generally responsible for performing the functionality of the given application 330, e.g., system monitoring, collecting data and generating reports/metrics/analytics, etc. These functions are well known in the art and are part of the data storage management functionality provided by system 300 as well as system 100. By additionally comprising awareness logic 333, which actively executes when core application process 459 executes, core application process 459 is said to be "self-aware" or to have "self-awareness" in the context of the present invention. Accordingly, awareness logic 333 executes within each core application process as described in more detail in other figures, e.g., FIG. 5.

Other process 460 is any computer-hosted process that is well known in the art and co-resides with a given storage management component on the same host computing device (e.g., 102, 106, 329, 339), but is not part of the storage management components described herein (e.g., 330, 340, 342, 344)—for example, Windows Services process(es), Apache process(es), etc. The Other process is capable of affecting how one or more of the storage management components (e.g., 330, 340, 342, 344) operate, which includes affecting how well each component's constituent processes (e.g., 454, 456, 458, 459) operate. For example, an Other process 460 that is leaking memory on the host computing device (e.g., 102, 106, 329, 339) directly affects the availability of main memory for the co-resident processes (e.g., 454, 456, 458, 459). Likewise, a runaway process that chews up CPU cycles will affect how much CPU is left for the storage management components running on the same computing device. Likewise, process handles (e.g., open resources) can run into limits that affect the functioning of co-resident storage management components. Therefore, according to the illustrative embodiments, one or more instances of awareness logic 333 are configured on the host computing devices to target respective corresponding Other processes 460 according to the illustrative embodiment, e.g., awareness logic 333 in storage management core process 454.

Thus, some of the techniques described herein in regard to storage management components and storage management operations are further applied to Other processes 460 that happen to be running co-resident with storage management components (e.g., 330, 340, 342, 344). Thus, although the Other process 460 depicted in the present figure is shown running co-resident with storage manager 340 in the present, the invention is not so limited. In alternative embodiments, one or more Other processes 460 run co-resident with data agent 342, media agent 344, and/or applications 330.

Because awareness logic 333 is configured to run within a given process such as 454, 456, 458, 459, the respective process is said to execute the logic implemented in awareness logic 333. Thus, the functionality of awareness logic 333 is accordingly attributed to the process in which it runs, e.g., 454, 456, 458, 459. Likewise, the functionality of awareness logic 333 is accordingly also attributed to the underlying computing device that hosts the respective process and its awareness logic, e.g., 102, 106, 329, 339.

Figure 5:
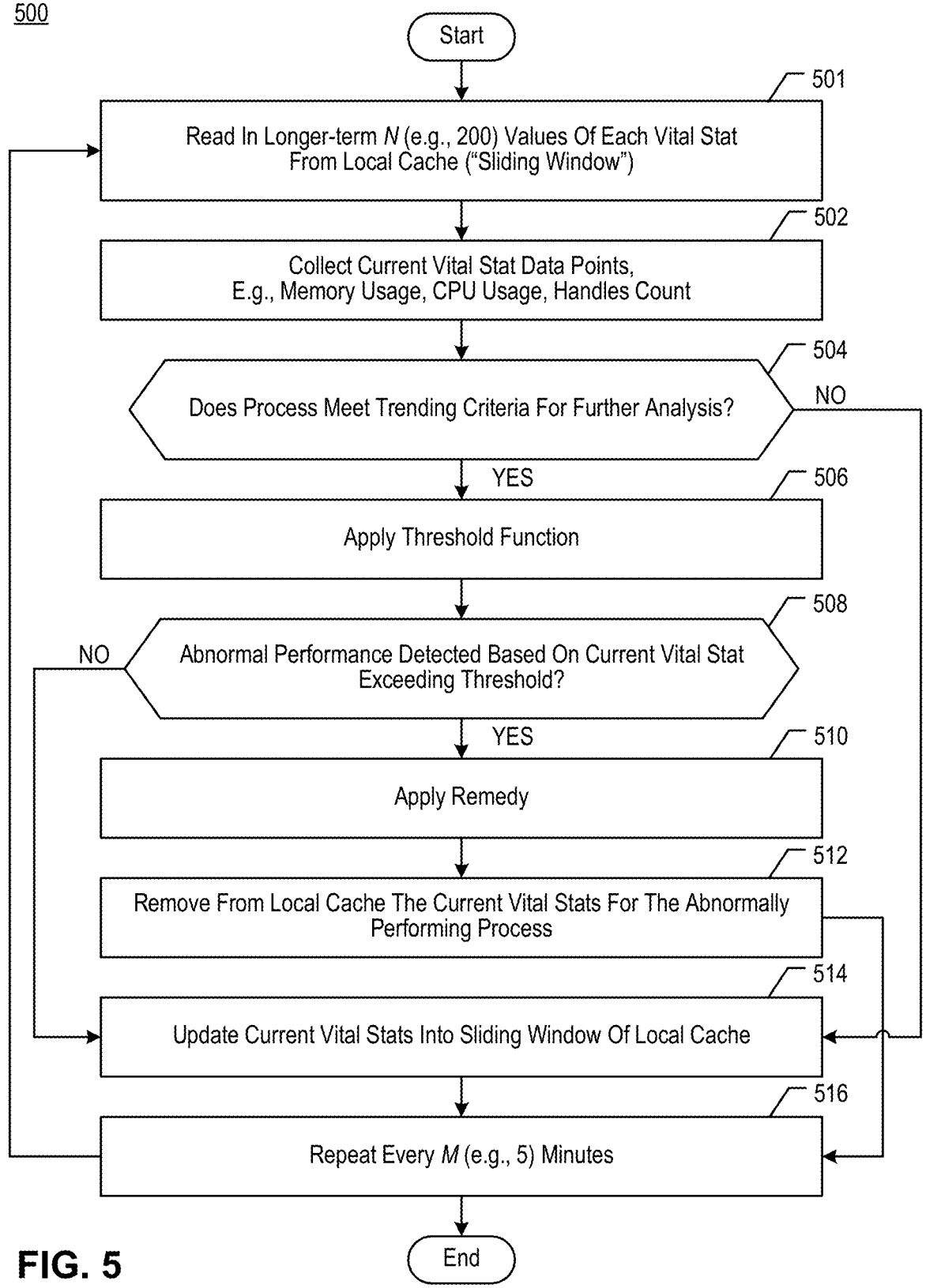
FIG. 5 depicts some salient operations of a method 500 according to an illustrative embodiment of the present invention.

FIG. 5 depicts some salient operations of a method 500 according to an illustrative embodiment of the present invention. In general, method 500 is executed by awareness logic 333, unless otherwise noted. According to the illustrative embodiments, each instance of awareness logic 333 executes independently of any other like instances on the same computing device (e.g., 102, 106, 329, 339) and/or in the same data storage management system 300. Thus, each instance of awareness logic 333 targets a particular instance of a particular process (e.g., 454, 456, 458, 459, 460) and operates in relation to that instance of the targeted process, whether in a "self-awareness" configuration or "external awareness" configuration. Therefore, each instance of awareness logic 333 operates with its own set of criteria such as threshold functions and parameters such as prescribed remedies, which are configured to be suitable to and relevant for the targeted process. Thus, each instance of awareness logic 333 performs its own method 500 in regard to a targeted process (e.g., 454, 456, 458, 459, 460).

At block 501, awareness logic 333 reads in a plurality of values of each vital statistic of the targeted process, which were collected periodically over a longer-term period of time and are illustratively kept in a local cache (not shown), e.g., in Windows Registry. A "sliding window," is maintained with every data collection cycle (e.g., every five minutes), wherein older data is replaced by newer data (except for block 512). Illustratively, the size of the sliding window is N data points for each vital statistic being collected for the process. Illustratively, the vital statistics for a given point in time are: (i) CPU capacity in use by the targeted process ("CPU usage"); (ii) main memory (RAM, computer-memory) being used by the targeted process ("memory usage"); and (iii) the number of handles used by the targeted process ("handles count"). The number of handles is typically based on the number of open resources associated with the process, e.g., open files, open sockets, and/or open pipes, etc. CPU usage, memory usage, and handles count are well known in the art.

Illustratively, the sliding window for any given vital statistic has a predefined size, e.g., comprises N=200 data points, but the invention is not so limited, and N can be any count of data points that is deemed suitable by the implementers. In the illustrative example, 200 data points collected at five-minute intervals result in a sliding window that covers over 16 hours of process running time. Illustratively, the sliding window comprises the most recent N (e.g., 200) entries for each vital statistic—except that vital statistics from a "leaky" process are not kept in the sliding window to prevent the longer-term data from being polluted (see, e.g., block 512). In the present example where N=200, and M=five-minute intervals, the illustrative sliding window comprises 200 data points for CPU usage, 200 data points for memory usage, and 200 data points for handle count. These are configurable, and any N and M values can be implemented in an alternative embodiment.

Thus, at this point, awareness logic 333 has read in the plurality of data points in the sliding window. Next, after collecting the current round of data points at block 502, awareness logic 333 will proceed with data analysis at block 504.

At block 502, awareness logic 333 determines the vital statistics of the targeted process at the current point in time, e.g., a respective value for current CPU usage, memory usage, and handle count—the so-called "current vital statistics" or "current vital statistics data points." Thus, awareness logic 333 determines (collects, obtains, acquires, finds), for the targeted process: (i) CPU capacity being used by the targeted process; (ii) main memory (RAM) being used by the targeted process; and/or (iii) the number of handles used by the targeted process. The current vital statistics are illustratively obtained from the operating system of the underlying computing device that hosts the storage management component within which awareness logic 333 operates, e.g., 102, 106, 329, 339, etc.

At block 504, which is a decision point, awareness logic 333 determines whether the targeted process meets criteria for further analysis, i.e., determining trend(s) in regard to the current vital statistics collected at block 502. The decision is based at least in part on analyzing local minima of the data points in the sliding window and a pattern of change of the local minima, as described in more detail in another figure. If the criteria are not met, the targeted process is considered to be running properly and control passes to block 514. If the criteria are met, control passes to block 506.

At block 506, having determined that further analysis of the targeted process is needed, awareness logic 333 applies a threshold function to the current vital statistics. The threshold function is illustratively based on a logarithm function of the data points in the sliding window—for each vital statistic therein, e.g., CPU usage, memory usage, and/or handle count. Thus, a threshold function is calculated for each vital statistic therein, e.g., CPU usage, memory usage, and/or handle count of the targeted process. The current vital statistic data point collected at block 502 (e.g., CPU usage, memory usage, or handle count) is mapped relative to the corresponding threshold function. See, e.g., FIG. 9.

At block 508, which is a decision point, awareness logic 333 determines whether the targeted process is performing unacceptably (abnormally, out of bounds, leaking), e.g., memory leak, CPU hogging, handle leak/unreleased handles, etc. The root cause of the abnormality is not what block 508 detects or determines. Rather, block 508 uses data analysis to decide whether the targeted process is experiencing abnormal behavior based on its historical pattern of performance. The analysis at block 508 is based on whether one or more of the current vital statistic data points (e.g., CPU usage, memory usage, and/or handle count collected at block 502) exceed the corresponding threshold curve, which is based on earlier data points in the sliding window. When a current vital-statistic data point exceeds the corresponding threshold curve (e.g., data point "X" in FIG. 9), the targeted process is considered to be performing abnormally and needs remedial action, as applied at block 510. Conversely, when a current vital-statistic data point falls below the corresponding threshold curve (e.g., data point "Y" in FIG. 9), the targeted process is considered to be within allowable performance parameters, at least in respect to the particular vital statistic, e.g., CPU usage, memory usage, and/or handle count. When none of the current vital statistic data points exceed their corresponding threshold functions (e.g., data point "Y" in FIG. 9), the targeted process as a whole requires no remedial action and control passes to block 514. Illustratively, it is enough for only one of the current vital statistics to exceed the corresponding threshold function in order to seem the targeted process to be "out of bounds" and performing abnormally, and thus requiring remedial action. In some alternative embodiments, more than one current vital statistic must be "out of bounds" in order to find abnormal performance and apply remedial action.

In some embodiments, abnormal performance is referred to as "leaky," describing a "leaky process." The term as used herein is not limited to "leaky memory," and does not specifically identify a root cause of the abnormal performance, but instead indicates an abnormally-performing process, regardless of which particular one or more aspects (e.g., memory, CPU, handles) are over-threshold and/or causing the abnormal (out of bounds, unacceptable) performance.

At block 510, awareness logic 333 applies a suitable remedy to the abnormally performing process. This block also comprises notifying developers so that they can investigate and debug the process. More details are given in another figure.

At block 512, awareness logic 333 removes from the sliding window in the local cache the current vital stats for the abnormally performing process, which were collected at block 502. Illustratively, the current vital statistics are stored by awareness logic 333 in local cache, but until the process is determined to be performing within normal bounds (e.g., block 504, 508), the current vital statistics data points are not added to the sliding window. Thus, at block 512, the current vital statistics collected at block 502 are purged from the local cache to avoid contaminating the collection of data in the sliding window. Control passes to block 516.

At block 514, awareness logic 333 adds the current vital statistics (collected at block 502) into the sliding window maintained in local cache, thereby updating the sliding window. These data points replace the corresponding oldest set of data points therein, and thus bring the vital statistics in the sliding window up to the current round of data collection, e.g., 200 data points for each vital statistic.

At block 516, awareness logic 333 maintains a clocking scheme that causes method 500 to repeat every M (e.g., 5, 10, etc.) minutes. Accordingly, awareness logic 333 passes control back to block 501 to begin the next round (cycle) of analysis of the targeted process. There is no limit on the value of M, and therefore in alternative embodiments awareness logic 333 repeats more frequently than every 5 minutes, whereas in other embodiments it repeats less frequently. Moreover, since each instance of awareness logic 333 operates independently (autonomously) of every other instance of awareness logic 333 in any given storage management component, each respective instance of awareness logic 333 is capable of being configured with a different repeat interval. For example, awareness logic 333 that operates within a core storage management process 454 repeats less frequently than awareness logic 333 that operates within a file identifier process 458; illustratively the rationale for this difference is that the former process 454 is more intensive and runs all the time so it should be less taxed by awareness logic 333, whereas the latter process 458 runs only on secondary copy operations (e.g., backup) and can afford to execute awareness logic 333 more frequently. A converse rationale is applied in other embodiments, where the more intensive processes such as 454 more frequently repeat method 500 in order to more closely monitor the process, while less intensive processes repeat method 500 less frequently.

Figure 6:
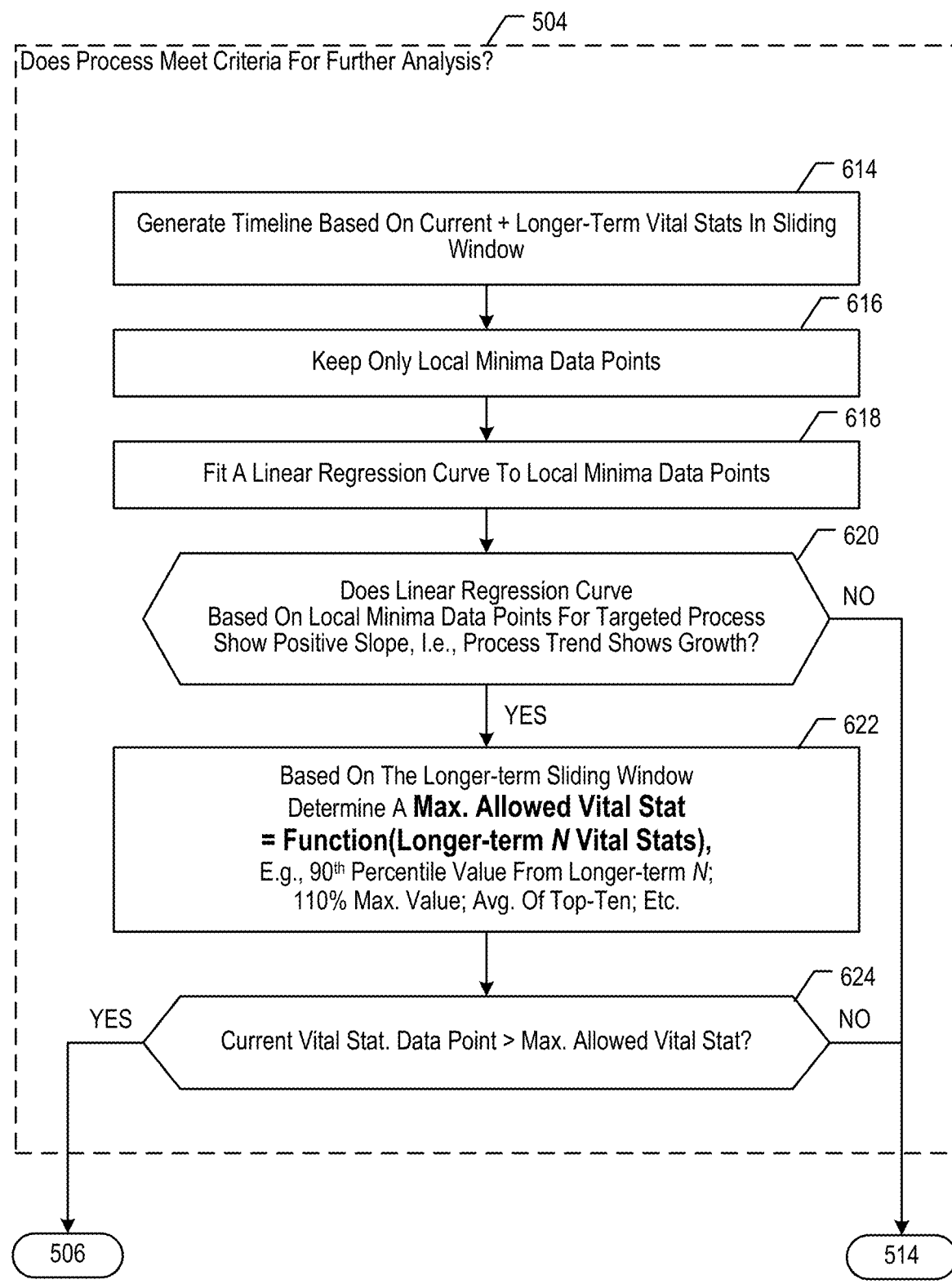
FIG. 6 depicts some salient operations of block 504 in method 500.

FIG. 6 depicts some salient operations of block 504 in method 500. At block 504, which is a decision point, awareness logic 333 determines whether the targeted process meets criteria for further analysis, i.e., trends in regard to the current vital statistics collected at block 502.

Figure 7:
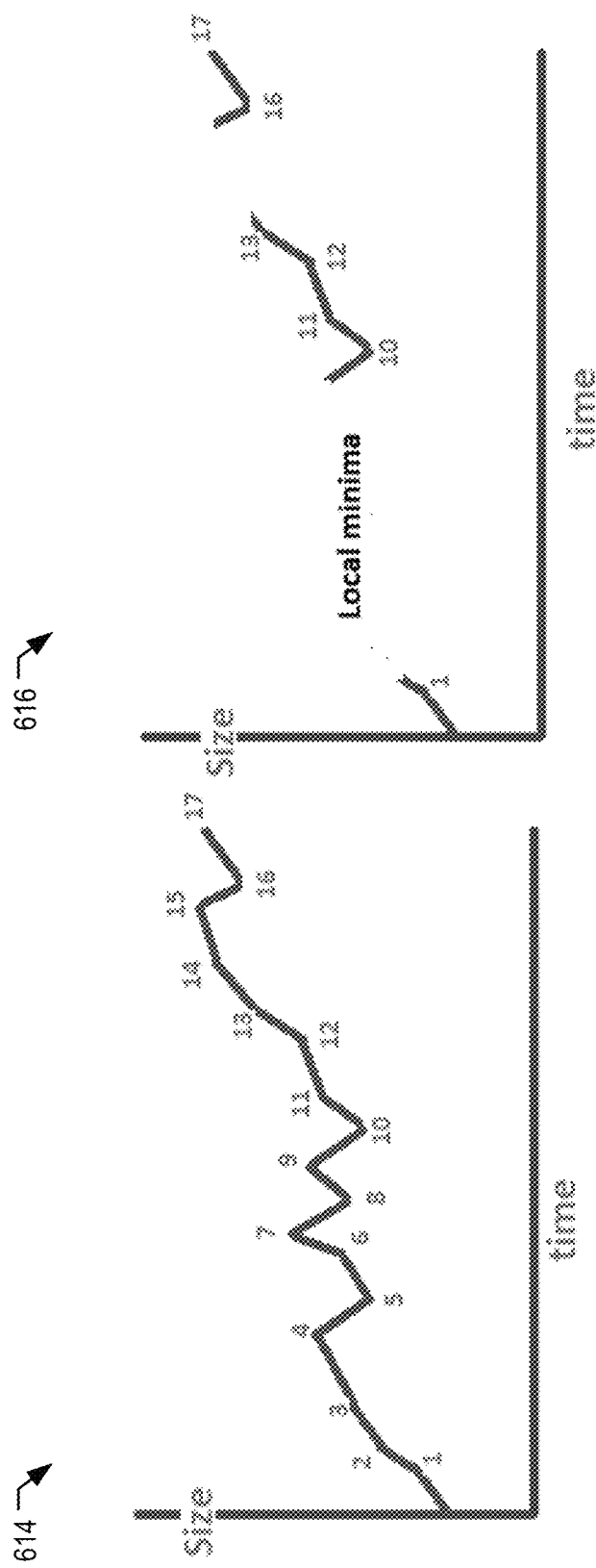
FIG. 7 depicts two timelines generated at blocks 614 and 616 in block 504 of method 500.

At block 614, awareness logic 333 generates a timeline based on the current vital statistics and the longer-term vital statistics in the sliding window. An example timeline is shown in FIG. 7, depicting a timeline comprising only 17 data points.

At block 616, awareness logic 333 keeps only local minima data points from the timeline generated at block 614. An example is depicted in FIG. 7. The minima form the basis for trending analysis of the vital statistics of the targeted process. A local minimum is defined as a data point that is preceded (though not necessarily immediately preceded) by one or more data points with a higher value. Thus, in regard to FIG. 7, data points 1, 10, 11, 12, 13, 16, and 17 are local minima that are subsequently used at block 618.

At block 618, awareness logic 333 fits a regression curve (e.g., a linear regression curve) to a timeline comprising the current vital statistic data point collected at block 502 and local minima data points identified in block 616. Regression curves are well known in the art. An example is depicted by the diagonal line in FIG. 8.

Figure 8:
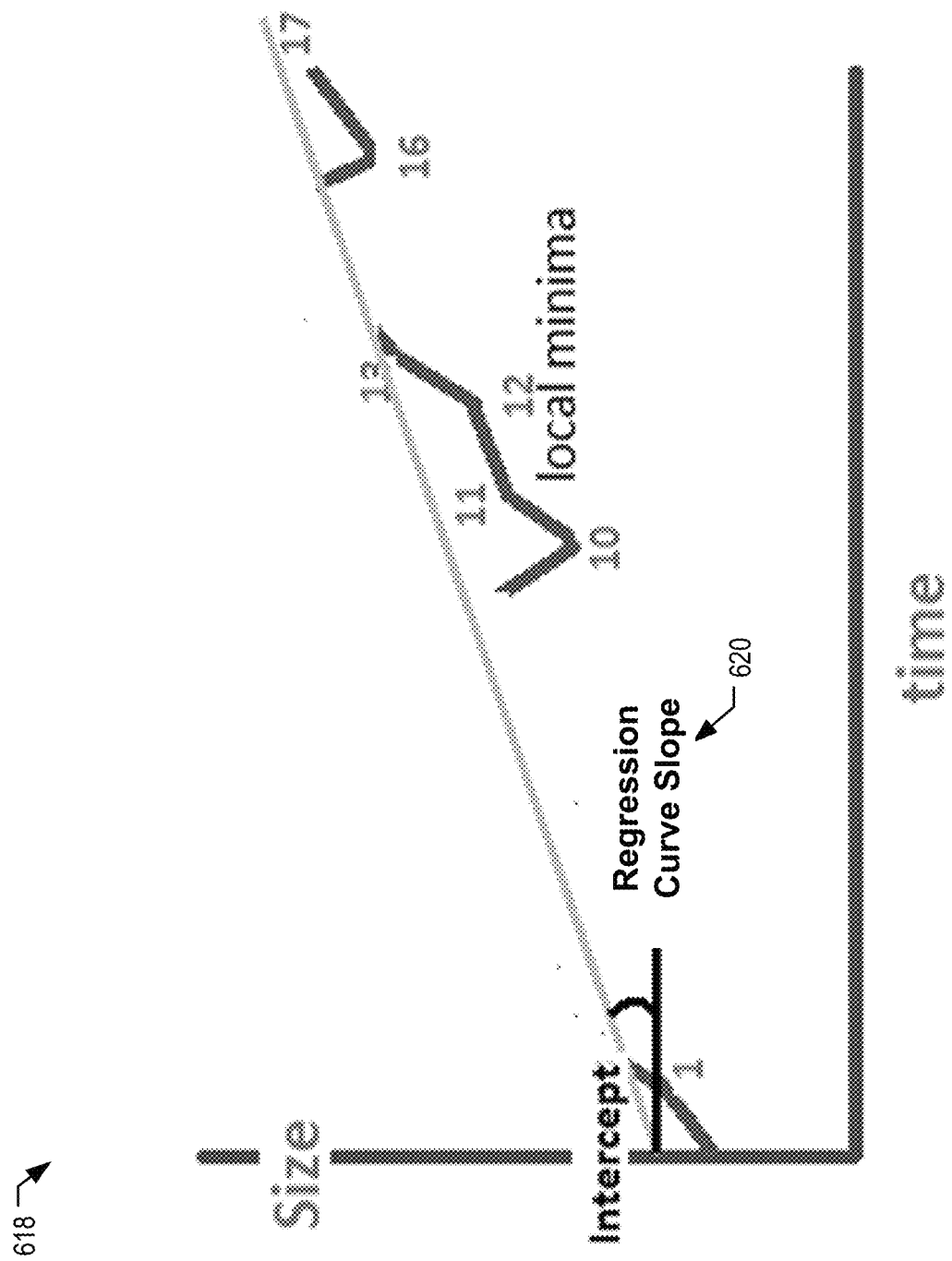
FIG. 8 depicts an analysis at blocks 618 and 620 in block 504 of method 500

At block 620, which is a decision point, awareness logic 333 determines whether the linear regression curve at block 618 has a positive slope, which shows a pattern of increasing value over time for the vital statistic being analyzed. An example is depicted in FIG. 8. Thus, awareness logic 333 determines whether the local-minima data points for one or more vital statistics (e.g., CPU usage, memory, handles) of the targeted process are showing a pattern of increasing value over time. A pattern of increasing value over time of the local minima data points indicates that even the best-case data points (local minima) are progressively growing. Best-case progressive growth can be an indicator of abnormal performance and control passes to block 622.

When the regression curve does not show a positive slope, no best-case progressive growth is found over the timeline. Therefore, awareness logic 333 concludes that the targeted process operates within acceptable bounds, and control passes (via the NO pathway) to block 514.

At block 622, which is reached due to a progressive growth of the best-case (local minima) data points over the timeline, awareness logic 333 performs further analysis based on the longer-term N (e.g., 200) vital statistics in the sliding window. Accordingly, awareness logic 333 determines a so-called "maximum allowed vital statistic" value for each of the tracked vital statistics (e.g., CPU usage, memory, handles), such that:

Maximum Allowed Vital Statistic=Function (Longer-Term N Vital Statistics).

Illustratively, each allowed maximum vital is a function of the longer-term data points, e.g., a percentile, a percentage, a quantile, etc. For example, in one illustrative embodiment, the maximum allowed value for CPU usage is the 90$^{th}$ percentile value calculated from the N longer-term values of CPU usage in the sliding window, i.e., close to the longer-term maximum. For example, in another illustrative embodiment, the maximum allowed value for CPU usage is 110% of the maximum CPU usage among the N longer-term values of CPU usage in the sliding window, i.e., somewhat more than the longer-term maximum. For example, in another illustrative embodiment, the maximum allowed value for CPU usage is an average of the ten highest CPU usage vitals in the sliding window, i.e., close to the longer-term maximum. Similar functions for the other vital statistics (e.g., memory usage, handle count) can be devised by the implementers after reading the present disclosure. The function and the parameters are chosen by the implementers and the invention is not limited in this regard.

At block 624, which is a decision point, awareness logic 333 determines whether one or more of the current vital statistic data points exceed the corresponding maximum allowed value calculated at block 622. If not, awareness logic 333 concludes that the targeted process operates within acceptable bounds, and control passes (via the NO pathway) to block 514 for updating the sliding window. Otherwise, awareness logic 333 concludes that the targeted process may be performing abnormally and control passes (via the YES pathway) to block 506 for further analysis.

FIG. 7 depicts two timelines generated at blocks 614 and 616 in block 504 of method 500.

The timeline on the left side of FIG. 7 depicts a timeline based on the current vital statistics and the longer-term vital statistics in the sliding window. To ease understanding for the reader, only 17 data points are shown here, fewer than the illustrative N=200 data points in the sliding window. Illustratively, data points 1-16 are the N data points from the sliding window and data point 17 is the current vital statistic collected at block 502. This timeline is created at block 614.

The timeline on the right side of FIG. 7 depicts only the local minima from the timeline on the left side of the present figure. This timeline is created at block 616. Illustratively, only data points 1, 10, 11, 12, 13, 16, and 17 qualify as local minima.

FIG. 8 depicts an analysis at blocks 618 and 620 in block 504 of method 500. Using the local minima-based timeline from block 616, at block 618 a regression curve is fitted to the local minima data points in a manner well known in the art. This is depicted by the diagonal line in the present figure. At block 620, awareness logic 333 determines whether the regression curve has a positive slope, i.e., rises over time. The illustrative regression curve shown here by the diagonal line has a positive slope, i.e., a pattern of rising values of the local minima data points over time.

Figure 9:
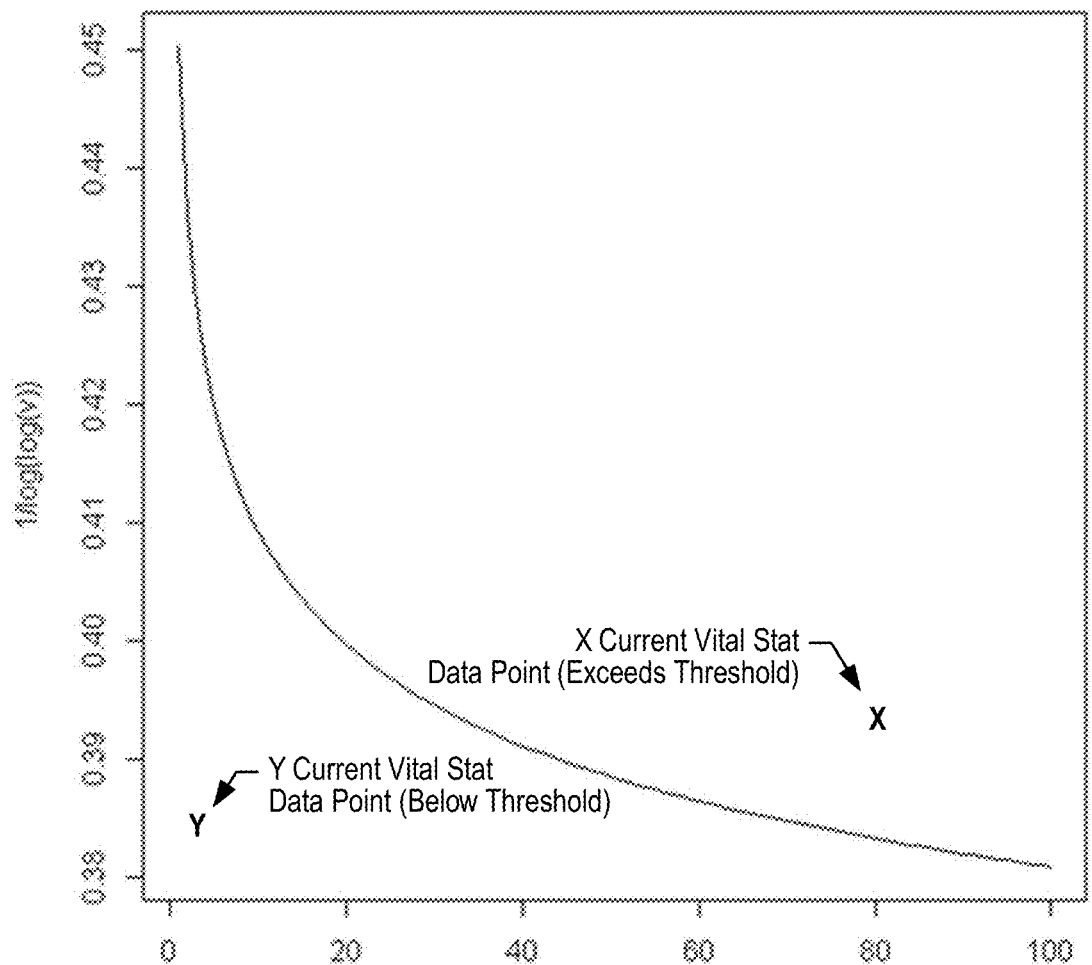
FIG. 9 depicts a threshold function as described in block 506 of method 500.

FIG. 9 depicts a threshold function as described in block 506 of method 500. At block 506 awareness logic 333 applies a threshold function to the current vital statistic data points. The threshold function is illustratively based on a logarithm function of the N data points in the sliding window. Thus, a threshold function is calculated for each vital statistic therein, e.g., CPU usage, memory usage, and/or handle count of the targeted process. The current vital statistic data point collected at block 502 (e.g., CPU usage, memory usage, or handle count) is mapped relative to the corresponding threshold function. Logarithm functions are well known in the art.

The present figure depicts an X-axis ranging from 0 to 100 over the N data points in the sliding window (e.g., a percentage measure of CPU usage), and a Y-axis that is calculated from:

$$1/\log(\log(v)),$$

where log is the logarithm function, and v is the value of the vital statistic being measured (e.g., CPU usage, memory size, handle count). The range of values in the X-axis corresponds to a range suitable to the N data points in the sliding window. Since CPU usage is generally reported as a percentage value, the depicted X-axis covers all range values of CPU usage i.e., 0% to 100%. Other range values are appropriate for memory usage and handle count.

This function is designed to provide consideration of and to allow different margins of variability based on the value v (on the X-axis) of the vital statistic being analyzed. Thus, the illustrative threshold function allows for a great deal of variability for low v, i.e., a smallish process that takes up a relatively small amount of resources (e.g., CPU usage), is allowed to vary quite a bit below the threshold function, because it will have a relatively low impact on the remaining amount of resource available to other processes. See, e.g., data point "X." Conversely, for a large value of v (e.g., CPU usage), the threshold function is less generous and allows for only a small margin of variability in order to protect the remaining resources. See, e.g., data point "Y."

When a current vital-statistic data point exceeds the corresponding threshold curve (e.g., data point "X"), the targeted process is considered to be performing abnormally and needs remedial action, as applied at block 510. Conversely, when a current vital-statistic data point falls below the corresponding threshold curve (e.g., data point "Y"), the targeted process is considered to operate within allowable behavior parameters, at least in respect to the particular vital statistic, e.g., CPU usage, memory usage, and/or handle count. In sum, the illustrative threshold function ensures that a targeted process with a small footprint is allowed bigger spikes, whereas a targeted process with a generally large footprint is given less leeway before being considered abnormal and in need of remedial action. The footprint refers to the relative size/amount of vital statistics of a targeted process relative to other processes running concurrently on the host computing device of the targeted process.

Figure 10:
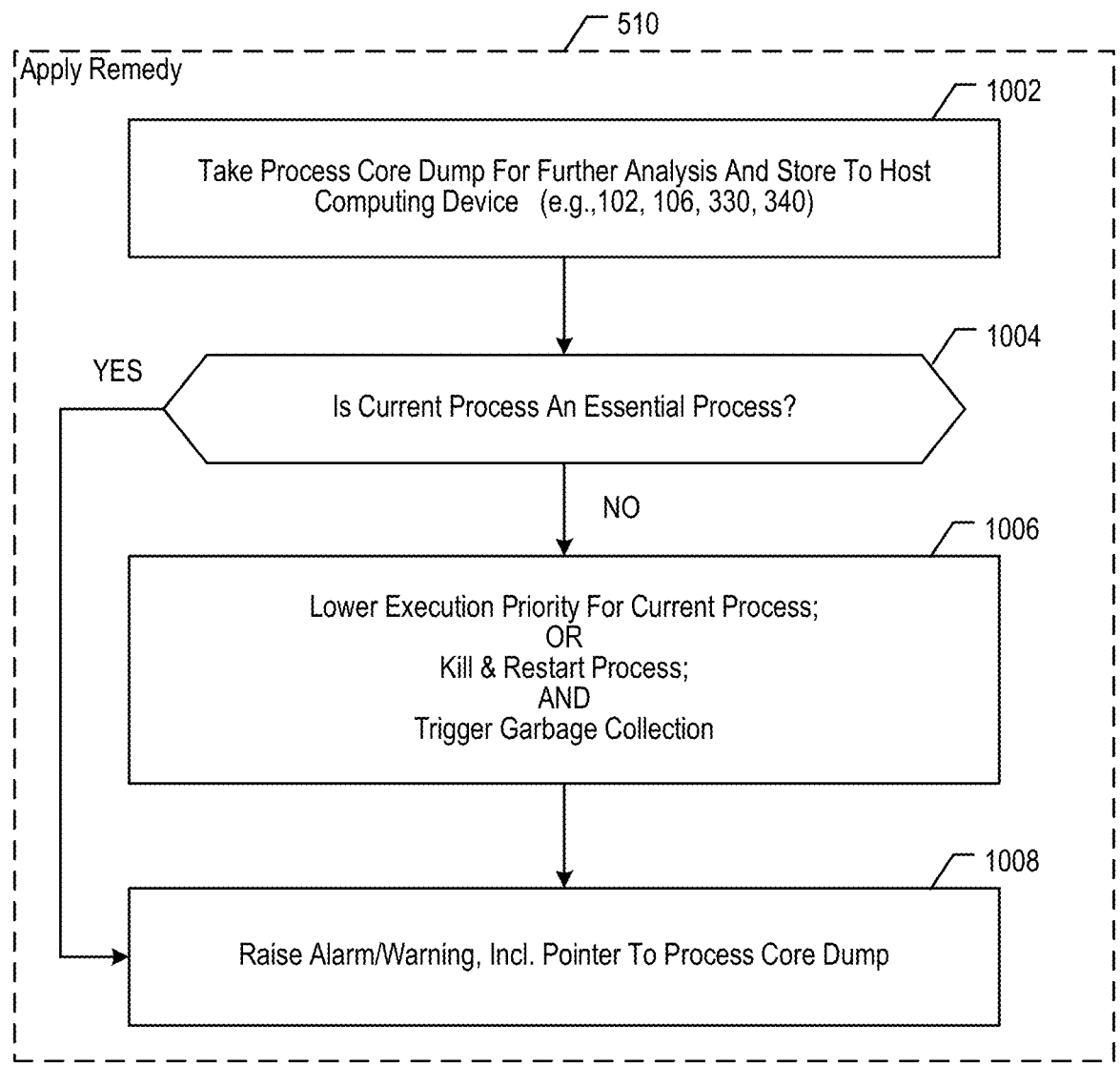
FIG. 10 depicts some salient operations of block 510 in method 500.

FIG. 10 depicts some salient operations of block 510 in method 500. Block 510 is reached after awareness logic 333 determines that its targeted process is performing abnormally and needs remedy. Accordingly, awareness logic 333 applies one or more remedies at block 510.

At block 1002, awareness logic 333 causes a core dump to be taken in respect to the targeted process (e.g., 454, 456, 458, 459, 460). Additionally, awareness logic 333 stores the core dump on the targeted process' host computing device (e.g., 102, 106, 329, 339). From here, developers and others can retrieve the core dump (not shown here) for further analysis. Core dumps are well known in the art.

At block 1004, awareness logic 333 determines whether the targeted process (e.g., 454, 456, 458, 459, 460) is an essential process. Illustratively, awareness logic 333 is configured to treat storage management core process 454 as an essential process, and to treat the other targeted processes (e.g., 456, 458, 459, 460) as non-essential, though the invention is not so limited. For example, in some embodiments, Other processes 460 that are not part of storage management system features are treated as essential, and thus deference is given to avoid destabilizing the underlying computing devices and/or data network (e.g., Windows Services). For essential processes, control passes to block 1008. For non-essential processes, control passes to block 1006.

At block 1006, which is executed for non-essential targeted processes, awareness logic 333 determines whether the targeted process can be killed or should continue operating with a lower priority. Illustratively, an Other process 460 is kept alive but at a lower priority. Lowering the priority frees up some cycles at the host computing device for executing whatever processes are pending. As shown later, other remedies are also applied along with alarms/notification (at block 1008) to enable further debugging and analysis by the development team, but in the meantime the targeted process is left to continue executing. In some embodiments, processes other than 460 such as 456, 458, and/or 459 are also kept alive with a lowered priority.

Illustratively, when the targeted process is log monitoring process 456, file identifier process 458, and/or core application process 459, awareness logic 333 kills the targeted process. Because the targeted process is part of storage management features in system 300, storage manager 340 detects that the process is not operational (killed) and causes the process to restart, e.g., by instructing the respective storage management component (e.g., storage manager 340, data agent 342, media agent 344) to restart the process. In some embodiments, storage management core process 454 in the respective storage management component is instructed to restart the targeted process 456/458.

Illustratively, awareness logic 333 also triggers "garbage collection" at the host computing device in respect to resources (e.g., memory) used by the targeted process. Garbage collection techniques are well known in the art. Control passes to block 1006.

At block 1008, awareness logic 333 is configured to raise alarm(s) and/or warning(s) to notify developers and others that the targeted process is performing abnormally. The alarm/warning illustratively includes the current vital statistics data points. The alarm/warning also includes information about and/or points to the core dump that was taken at block 1002. Thus, based on determining at block 508 that the targeted process (e.g., 454, 456, 458, 459, 460) is "out of bounds" and performing abnormally, awareness logic 333 raises alarm(s)/warning(s) to that effect, which will enable developers and/or system administrators to analyze the respective process core dump and other information to help debug the targeted process. Although system 300 is not able to identify the root cause that might have caused a targeted process to go "out of bounds" the core dump(s) and alarms will give developers and others an opportunity to examine the core dump(s) and the current vital statistics data points to better understand what is happening in the system and in the particular targeted process that went "out of bounds" of acceptable performance.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

According to an illustrative embodiment, a data storage management system comprises: "awareness logic" that executes on computing devices hosting storage management components such as storage manager, data agent, media agent, and other storage management applications. The above-recited system wherein the awareness logic operates within each of these illustrative components, e.g., as a thread within key processes that execute within the storage management component, such as storage management core process, file identifier process, log monitoring process, etc. The above-recited process wherein the awareness logic monitors the targeted process over time and triggers remedial action when criteria are met. The above-recited system wherein certain vital statistics of each process are collected periodically and analyzed by the illustrative awareness logic, such as CPU usage, memory usage, and handle counts. The above-recited system wherein criteria for corrective action include rising trends based on local minima data points for one or more vital statistics of the process. The above-recited system wherein other criteria include exceeding a threshold based on a logarithm function of the collected data points According to another illustrative embodiment, a method for determining whether a data storage management process performs unacceptably based on local minima data points and a logarithmic function of previously-measured data points of certain vital statistics of the process, the method comprising: measuring a first data point of a first vital statistic of a process that executes on a computing device that comprises one or more hardware processors and computer memory, wherein the process executes in one of a storage manager component, a data agent component, and a media agent component of a data storage management system; maintaining a set of previously-measured data points of the first vital statistic of the process. The above-recited method further comprising: when: (i) a regression curve for local minima data points has a positive slope, determining that the process operates unacceptably. The above-recited method further comprising: when: (ii) the first data point of the first vital statistic exceeds a threshold value based on a logarithm function of the set of data points, determining that the process operates unacceptably. The above-recited method further comprising: when: (i) a regression curve for local minima data points has a positive slope, and (ii) the first data point of the first vital statistic exceeds a threshold value based on a logarithm function of the set of data points, determining that the process operates unacceptably. The above-recited method further comprising: (a) applying one or more remedial measures to the process. The above-recited method further comprising: (b) refraining from adding the first data point of the first vital statistic to the set of data points. The above-recited method further comprising: when at least one of: (A) the regression curve for the local minima data points does not have a positive slope, and (B) the first data point of the first vital statistic does not exceed the threshold value based on a logarithm function of the set of data points, determining that the process operates acceptably with regard to the first vital statistic. The above-recited method further comprising: replacing an oldest data point in the set of data points with the first data point of the first vital statistic.

The above-recited method wherein the first vital statistic is one of CPU usage, computer-memory usage, and a count of process handles. The above-recited method wherein the process is a storage management core process in one of a storage manager component, a data agent component, and a media agent component of a data storage management system. The above-recited method wherein the regression curve for local minima data points that has a positive slope indicates that the first vital statistic has a pattern of increasing value over time. The above-recited method wherein the determining that the process operates unacceptably when the regression curve for local minima data points has a positive slope is based on a trend of increase of the first vital statistic over time.

According to yet another illustrative embodiment, a data storage management system comprising: a first computing device comprising one or more hardware processors and corresponding computer memory, wherein the first computing device is configured to execute at least one of a storage manager, a data agent, and a media agent; and wherein the first computing device is further configured to: periodically measure a first data point of a first vital statistic of a process that executes on the first computing device. The above-recited system wherein the first vital statistic is one of CPU usage, computer-memory usage, and a count of process handles. The above-recited system wherein the process executes in one of the storage manager, the data agent, and the media agent. The above-recited system wherein the first computing device is configured to maintain a set of previously-measured data points of the first vital statistic of the process. The above-recited system wherein the first computing device is configured to apply one or more remedial measures to the process when: (i) a regression curve for local minima data points has a positive slope. The above-recited system wherein the first computing device is configured to apply one or more remedial measures to the process when: (i) a regression curve for local minima data points has a positive slope, wherein each local minimum data point is determined from among the set of previously-measured data points and the first data point. The above-recited system wherein the first computing device is configured to based at least in part on a trend of increase of the first vital statistic over time, as shown by the regression curve, refrain from adding the first data point of the first vital statistic to the set of previously-measured data points.

The above-recited system wherein the first computing device is further configured to apply the one or more remedial actions when: (ii) the first data point of the first vital statistic exceeds a maximum allowed value that is based on the set of previously-measured data points. The above-recited system wherein the first computing device is further configured to apply the one or more remedial actions when: (iii) the first data point of the first vital statistic exceeds a threshold value based on a logarithm function of the set of previously-measured data points. The above-recited system wherein the first computing device is further configured to replace an oldest data point in the set of data points with the current measure of the first vital statistic when at least one of: (A) the regression curve for local minima data points does not have a positive slope, and (B) the first data point of the first vital statistic does not exceed a threshold value based on a logarithm function of the set of previously-measured data points.

According to an example embodiment, a method for determining whether a data storage management process performs unacceptably based on local minima data points and a logarithmic function of previously-measured data points of certain vital statistics of the process, the method comprising: measuring a first data point of a first vital statistic of a process that executes on a computing device that comprises one or more hardware processors and computer memory. The above-recited method wherein the first vital statistic is one of CPU usage, computer-memory usage, and a count of process handles. The above-recited method wherein the process executes in one of a storage manager component, a data agent component, and a media agent component of a data storage management system. The above-recited method further comprising: maintaining a set of previously-measured data points of the first vital statistic of the process. The above-recited method further comprising: applying one or more remedial measures to the process when: (i) a regression curve for local minima data points has a positive slope, wherein each local minimum data point is determined from among the set of previously-measured data points and the first data point. The above-recited method further comprising: applying one or more remedial measures to the process when: (ii) the first data point of the first vital statistic exceeds a maximum allowed value that is based on the set of previously-measured data points. The above-recited method further comprising: applying one or more remedial measures to the process when: (iii) the first data point of the first vital statistic exceeds a threshold value based on a logarithm function of the set of previously-measured data points. The above-recited method further comprising: applying one or more remedial measures to the process when: (i) a regression curve for local minima data points has a positive slope, wherein each local minimum data point is determined from among the set of previously-measured data points and the first data point, and (ii) the first data point of the first vital statistic exceeds a maximum allowed value that is based on the set of previously-measured data points, and (iii) the first data point of the first vital statistic exceeds a threshold value based on a logarithm function of the set of previously-measured data points. The above-recited method further comprising: refraining from adding the first data point of the first vital statistic to the set of previously-measured data points.

The above-recited method wherein the applying of the one or more remedial actions to the process is based on a trend of increase of the first vital statistic over time, as shown by the regression curve. The above-recited method wherein the measuring, maintaining, applying, and refraining are performed by a thread configured in the process. The above-recited method wherein the measuring, maintaining, applying, and refraining are performed by an awareness logic operating in the process. The above-recited method further comprising: replacing an oldest data point in the set of data points with the current measure of the first vital statistic when at least one of: (A) the regression curve for local minima data points does not have a positive slope, and (B) the first data point of the first vital statistic does not exceed a threshold value based on a logarithm function of the set of previously-measured data points. The above-recited method further comprising: replacing an oldest data point in the set of data points with the current measure of the first vital statistic when: (A) the regression curve for local minima data points does not have a positive slope, and (B) the first data point of the first vital statistic does not exceed a threshold value based on a logarithm function of the set of previously-measured data points.

According to another example embodiment, a computer-readable medium, excluding transitory propagating signals, storing instructions that, when executed by at least one computing device comprising one or more processors and computer memory, cause the computing device to perform operations comprising: measuring a first data point of a first vital statistic of a process that executes on a computing device that comprises one or more hardware processors and computer memory, wherein the first vital statistic is one of CPU usage, computer-memory usage, and a count of process handles, and wherein the process executes in one of a storage manager component, a data agent component, and a media agent component of a data storage management system. The above-recited computer-readable medium wherein the operations further comprise: maintaining a set of previously-measured data points of the first vital statistic of the process. The above-recited computer-readable medium wherein the operations further comprise: applying one or more remedial measures to the process when: (i) a regression curve for local minima data points has a positive slope, wherein each local minimum data point is determined from among the set of previously-measured data points and the first data point. The above-recited computer-readable medium wherein the operations further comprise: applying one or more remedial measures to the process when: (ii) the first data point of the first vital statistic exceeds a maximum allowed value that is based on the set of previously-measured data points. The above-recited computer-readable medium wherein the operations further comprise: applying one or more remedial measures to the process when: (iii) the first data point of the first vital statistic exceeds a threshold value based on a logarithm function of the set of previously-measured data points. The above-recited computer-readable medium wherein the operations further comprise: applying one or more remedial measures to the process when: (i) a regression curve for local minima data points has a positive slope, wherein each local minimum data point is determined from among the set of previously-measured data points and the first data point, and (ii) the first data point of the first vital statistic exceeds a maximum allowed value that is based on the set of previously-measured data points, and (iii) the first data point of the first vital statistic exceeds a threshold value based on a logarithm function of the set of previously-measured data points. The above-recited computer-readable medium wherein the operations further comprise: refraining from adding the first data point of the first vital statistic to the set of previously-measured data points.

According to yet another example embodiment a computer-readable medium, excluding transitory propagating signals, storing instructions that, when executed by at least one computing device comprising one or more processors and computer memory, cause the computing device to perform operations comprising: measuring a first data point of a first vital statistic of a process that executes on a computing device that comprises one or more hardware processors and computer memory, wherein the process executes in one of a storage manager component, a data agent component, and a media agent component of a data storage management system; maintaining a set of previously-measured data points of the first vital statistic of the process. The above-recited computer-readable medium wherein the operations further comprise: when: (i) a regression curve for local minima data points has a positive slope, and/or (ii) the first data point of the first vital statistic exceeds a threshold value based on a logarithm function of the set of data points, determining that the process operates unacceptably and: (a) applying one or more remedial measures to the process, and/or (b) refraining from adding the first data point of the first vital statistic to the set of data points. The above-recited computer-readable medium wherein the operations further comprise:

when: (A) the regression curve for the local minima data points does not have a positive slope, and/or (B) the first data point of the first vital statistic does not exceed the threshold value based on a logarithm function of the set of data points, determining that the process operates acceptably with regard to the first vital statistic, and replacing an oldest data point in the set of data points with the first data point of the first vital statistic.

According to another example embodiment, a computer-readable medium, excluding transitory propagating signals, storing instructions that, when executed by a computing device comprising one or more processors and computer memory, cause the computing device to: execute at least one of a storage manager, a data agent, and a media agent; periodically measure a first data point of a first vital statistic of a process that executes on the computing device, wherein the first vital statistic is one of CPU usage, computer-memory usage, and a count of process handles, and wherein the process executes in one of the storage manager, the data agent, and the media agent. The above-recited computer-readable medium further comprising: maintain a set of previously-measured data points of the first vital statistic of the process. The above-recited computer-readable medium further comprising: apply one or more remedial measures to the process when: (i) a regression curve for local minima data points has a positive slope, wherein each local minimum data point is determined from among the set of previously-measured data points and the first data point. The above-recited computer-readable medium further comprising: based at least in part on a trend of increase of the first vital statistic over time, as shown by the regression curve, refrain from adding the first data point of the first vital statistic to the set of previously-measured data points. The above-recited computer-readable medium wherein the first computing device is further configured to apply the one or more remedial actions when: (ii) the first data point of the first vital statistic exceeds a maximum allowed value that is based on the set of previously-measured data points. The above-recited computer-readable medium wherein the first computing device is further configured to apply the one or more remedial actions when: (iii) the first data point of the first vital statistic exceeds a threshold value based on a logarithm function of the set of previously-measured data points. The above-recited computer-readable medium wherein the first computing device is further configured to replace an oldest data point in the set of data points with the current measure of the first vital statistic when at least one of: (A) the regression curve for local minima data points does not have a positive slope, and (B) the first data point of the first vital statistic does not exceed a threshold value based on a logarithm function of the set of previously-measured data points.

According to still another example embodiment, a method comprising: at a first measurement event, measuring a first data point of a first vital statistic of a process that executes on a computing device comprising one or more hardware processors and computer memory. The above-recited method further comprising: maintaining a set of data points for the first vital statistic of the process, wherein the data points were previously collected by the process over a plurality of past measurement events. The above-recited method further comprising: determining that the process operates unacceptably when: (i) a regression curve for local minima data points has a positive slope, and/or (ii) the current measure of the first vital statistic exceeds a threshold value based on a logarithm function based on the set of data points. The above-recited method further comprising: based on the determining that the process operates unacceptably: (a) applying one or more remedial measures to the process, and/or (b) refraining from adding the current measure of the first vital statistic to the set of data points. The above-recited method further comprising: determining that the process operates acceptably with regard to the first vital statistic when at least one of: (A) the regression curve for the local minima data points does not have a positive slope, and (B) the current measure of the first vital statistic does not exceed the threshold value based on a logarithm function based on the set of data points. The above-recited method further comprising: based on the determining that the process operates acceptably with regard to the first vital statistic, replacing an oldest data point in the set of data points with the current measure of the first vital statistic.

The above-recited method wherein the first vital statistic is CPU usage. The above-recited method wherein the first vital statistic is computer-memory usage. The above-recited method wherein the first vital statistic is a count of process handles. The above-recited method wherein the first vital statistic is one of CPU usage, computer-memory usage, and a count of process handles. The above-recited method wherein the determining that the process operates unacceptably, is further when: (iii) the current measure of the first vital statistic exceeds a maximum allowed value that is based on the set of data points. The above-recited method wherein the regression curve for local minima data points that has a positive slope indicates that the first vital statistic has a pattern of increasing value over time. The above-recited method wherein the determining that the process operates unacceptably when the regression curve for local minima data points has a positive slope is based on a trend of increase of the first vital statistic over time. The above-recited method wherein one of the one or more remedial actions is to lower a priority for executing the process. The above-recited method wherein one of the one or more remedial actions is to kill the process. The above-recited method wherein one of the one or more remedial actions is to initiate automatic management of computer-memory resources used by the process (garbage collection). The above-recited method wherein one of the one or more remedial actions is to initiate a core dump of the process and to store the resulting core dump data to the computing device that hosts the process. The above-recited method wherein one of the one or more remedial actions is to initiate an alarm indicating that the process is performing unacceptably. The above-recited method wherein one of the one or more remedial actions is to initiate an alarm indicating that the process is performing unacceptably, and wherein the alarm comprises the current measure of the first vital statistic. The above-recited method wherein the taking of the current measure, the maintaining, the replacing, applying, the refraining, and the determining operations are performed by the process. The above-recited method wherein the taking of the current measure, the maintaining, the replacing, applying, the refraining, and the determining operations are performed by a thread configured in the process. The above-recited method wherein the taking of the current measure, the maintaining, the replacing, applying, the refraining, and the determining operations are performed by an awareness logic that targets the process, and wherein the awareness logic is configured in one of a storage manager component, a data agent component, and a media agent component of a data storage management system. The above-recited method wherein the taking of the current measure, the maintaining, the replacing, applying, the refraining, and the determining operations are performed by an awareness logic that targets the process, wherein the awareness logic executes in one of a storage manager component, a data agent component, and a media agent component of a data storage management system, and wherein the process does not execute in the respective one of the storage manager component, the data agent component, and the media agent component. The above-recited method wherein the process is a storage management core process in one of a storage manager component, a data agent component, and a media agent component of a data storage management system. The above-recited method wherein the process is a storage management core process in one of a storage manager component, a data agent component, and a media agent component of a data storage management system. The above-recited method wherein the taking of the current measure, the maintaining, the replacing, applying, the refraining, and the determining operations are performed by an awareness logic operating in the process. The above-recited method wherein the process is a log monitoring process in one of a storage manager component, a data agent component, and a media agent component of a data storage management system. The above-recited method wherein the process is a log monitoring process in one of a storage manager component, a data agent component, and a media agent component of a data storage management system. The above-recited method wherein the taking of the current measure, the maintaining, the replacing, applying, the refraining, and the determining operations are performed by an awareness logic operating in the process. The above-recited method wherein the process is a file identifier process in a data agent component of a data storage management system. The above-recited method wherein the process is a file identifier process in a data agent component of a data storage management system. The above-recited method wherein the taking of the current measure, the maintaining, the replacing, applying, the refraining, and the determining operations are performed by an awareness logic operating in the process. The above-recited method wherein the process is a file identifier process in a data agent component of a data storage management system.

According to another embodiment, a targeted process hosted by a computing device receives one or more remedial actions when the process is determined to operetta unacceptably, based on: (i) a regression curve has a positive slope, wherein the regression curve is fitted to a timeline comprising a first data point of the first vital statistic of the targeted process and local minima among a set of previously-measured data points of the first vital statistic, and (ii)

the first data point of the first vital statistic exceeds a threshold value based on a logarithm function of the set of previously-measured data points of the first vital statistic. The above-recited method wherein the targeted process is a process for data storage management. The above-recited method wherein the targeted process is a process for data storage management designated a storage management core process. The above-recited method wherein the targeted process is a process for data storage management designated a file identifier process. The above-recited method wherein the targeted process is a process for data storage management designated a log monitoring process. The above-recited method wherein the targeted process is a process for data storage management that executes within a storage manager, a data agent, and/or a media agent in a data storage management system. The above-recited method wherein the targeted process is a process for data storage management that executes outside of and co-resides with a storage manager, a data agent, and/or a media agent in a data storage management system. The above-recited method wherein the remedial action is at least one of: killing and restarting the process when the process is not considered essential in the data storage management system, lowering the priority of the targeted process when the process is not considered essential in the data storage management system; taking a cored sump of the targeted process, triggering garbage collection of the targeted process, and raising an alarm indicating that the targeted process is performing unacceptably and pointing to one or more core dumps taken of the targeted process. The above-recited method wherein the targeted process is a log monitoring thread that runs within a storage management core process. The above-recited method wherein the targeted process is file identifier thread that runs within a storage management core process. The above-recited method executed by an awareness logic that executes as a thread within a data storage management process, which is part of a storage manager, a data agent, and/or a media agent. The above-recited method executed by an awareness logic that executes as a thread within a storage manager, a data agent, and/or a media agent. The above-recited method executed by an awareness logic that executes on a computing device hosting a storage manager, a data agent, and/or a media agent.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method for determining whether a software process executing on a computing device performs unacceptably, the method comprising:
   on a computing device that comprises one or more hardware processors and executes a process for data storage management in at least one software-implemented component of a data storage management system:
   fitting a regression curve to data points that are local minima among a set of previously-measured data points of a first vital statistic of the process,
   wherein the first vital statistic is one of: CPU usage, computer-memory usage, and a count of process handles;
   determining that the process operates unacceptably based on determining that:
   (i) the regression curve of the local minima data points has a positive slope, and
   (ii) a first data point of the first vital statistic exceeds a threshold value based on a logarithm function of the set of previously-measured data points of the first vital statistic of the process; and
   based on the determining that the process operates unacceptably, applying a remedial measure to the process.

2. The method of claim 1 wherein the first data point is measured after measuring the set of previously-measured data points.

3. The method of claim 1, wherein the determining that the process operates unacceptably is based on additionally determining that: (iii) the first data point of the first vital statistic exceeds a maximum allowed value that is a statistical function of values of the first vital statistic in the set of previously-measured data points.

4. The method of claim 1, wherein the set of previously-measured data points are maintained in a sliding window and the method further comprising:
   based on determining that the process operates acceptably, replacing an oldest data point in the sliding window with the first data point of the first vital statistic; and
   based on the determining that the process operates unacceptably, excluding the first data point of the first vital statistic from the sliding window.

5. The method of claim 1, further comprising:
   determining that the process operates acceptably with regard to the first vital statistic based on determining at least one of:
   (A) the regression curve of the local minima data points does not have a positive slope, and
   (B) the first data point of the first vital statistic does not exceed the threshold value.

6. The method of claim 1, wherein the process is a core process for storage management and the remedial measure comprises taking a core dump.

7. The method of claim 1, wherein the process is not a core process for storage management and the remedial measure comprises one or more of: lowering a priority of the process and restarting the process.

8. The method of claim 1, wherein the process is one of: a storage management core process, a file identifier process, and a log monitoring process.

9. The method of claim 1, wherein the at least one software-implemented component is one of a storage manager, a data agent, a media agent, a system monitor, and a report server.

10. A system comprising:
 a computing device comprising one or more hardware processors that provide a virtualized computing configuration for executing at least one software-implemented component of a data storage management system;
 wherein the at least one software-implemented component of the data storage management system is configured to:
 periodically measure a first data point of a first vital statistic of a process that executes on the computing device, wherein the first vital statistic is one of: CPU usage, computer-memory usage, and a count of process handles,
 fit a regression curve to data points that are local minima among a set of previously-measured data points of the first vital statistic of the process for data storage management, and
 apply a remedial measure to the process based on determining that:
 (i) the regression curve of the local minima data points has a positive slope, and
 (ii) a first data point of the first vital statistic exceeds a threshold value based on a logarithm function of the set of previously-measured data points of the first vital statistic of the process.

11. The system of claim 10, wherein the first data point is measured after measuring the set of previously-measured data points.

12. The system of claim 10, wherein the remedial measure is applied based on additionally determining that (iii) the first data point of the first vital statistic exceeds a maximum allowed value that is a statistical function of values in the set of previously-measured data points.

13. The system of claim 10, wherein the set of previously-measured data points are maintained in a sliding window stored in a cache associated with the at least one software-implemented component of the data storage management system.

14. The system of claim 13, wherein the first data point of the first vital statistic replaces an oldest data point in the sliding window based on determining that the process operates acceptably, and wherein the first data point of the first vital statistic is not added to the sliding window based on determining that the process operates unacceptably.

15. The system of claim 10, wherein the process is part of the at least one software-implemented component of the data storage management system, wherein the at least one software-implemented component is one of a storage manager, a data agent, a media agent, a system monitor, and a report server.

16. A system comprising:
 a computing device comprising one or more hardware processors that provide a virtualized computing configuration for executing at least one software-implemented component of a data storage management system;
 wherein the at least one software-implemented component of the data storage management system is configured to:
 periodically measure a first data point of a first vital statistic of a process for data storage management, wherein the process executes on the computing device, wherein the first vital statistic is one of: CPU usage, computer-memory usage, and a count of process handles,
 fit a regression curve to data points that are local minima among a set of previously-measured data points of the first vital statistic of the process, and
 apply a remedial measure to the process based on determining that:
 (i) the regression curve of the local minima data points has a positive slope,
 (ii) a first data point of the first vital statistic exceeds a threshold value based on a logarithm function of the set of previously-measured data points of the first vital statistic of the process, and
 (iii) the first data point of the first vital statistic exceeds a maximum allowed value that is a statistical function of values in the set of previously-measured data points.

17. The system of claim 16, wherein the first data point is measured after measuring the set of previously-measured data points.

18. The system of claim 16, wherein the set of previously-measured data points are maintained in a sliding window stored in a cache associated with the at least one software-implemented component of the data storage management system.

19. The system of claim 18, wherein the first data point of the first vital statistic replaces an oldest data point in the sliding window based on determining that the process operates acceptably, and wherein the first data point of the first vital statistic is not added to the sliding window based on determining that the process operates unacceptably.

20. The system of claim 16, wherein the process is part of the at least one software-implemented component of the data storage management system, wherein the at least one software-implemented component is one of: a storage manager, a data agent, a media agent, a system monitor, and a report server.

* * * * *